United States Patent
Vermandel et al.

(10) Patent No.: US 9,534,118 B2
(45) Date of Patent: *Jan. 3, 2017

(54) HIGH WET FAST DISPERSE DYE MIXTURES

(71) Applicant: DyStar Colours Distribution GmbH, Raunheim (DE)

(72) Inventors: Fanny Vermandel, Singapore (SG); Adrian Murgatroyd, Frankfurt (DE); Clemens Grund, Hattersheim (DJ); Manfred Hoppe, Kürten (DE); Ulrich Weingarten, Ludwigshafen (DE)

(73) Assignee: DyStar Colours Distribution GmbH (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/760,832

(22) PCT Filed: Jan. 6, 2014

(86) PCT No.: PCT/EP2014/050069
§ 371 (c)(1),
(2) Date: Jul. 14, 2015

(87) PCT Pub. No.: WO2014/108358
PCT Pub. Date: Jul. 17, 2014

(65) Prior Publication Data
US 2015/0344695 A1    Dec. 3, 2015

(51) Int. Cl.
*C09B 62/00* (2006.01)
*C09B 67/22* (2006.01)
(Continued)

(52) U.S. Cl.
CPC ........... *C09B 67/0051* (2013.01); *C09B 23/00* (2013.01); *C09B 29/3691* (2013.01); *D06P 1/18* (2013.01);
(Continued)

(58) Field of Classification Search
CPC .. C09B 67/0051; C09B 29/3691; C09B 23/00; C06P 3/6041; C06P 1/18; C06P 3/54; C06P 3/043
(Continued)

(56) References Cited

U.S. PATENT DOCUMENTS 3,337,288 A * 8/1967 Horiguchi .............. C08F 4/00
430/108.1
3,980,634 A    9/1976 Weaver
(Continued)

FOREIGN PATENT DOCUMENTS

CN    101735663 A    6/2010
CN    101760046 A    6/2010
(Continued)

OTHER PUBLICATIONS

STIC Search Report dated Apr. 27, 2016.*
(Continued)

*Primary Examiner* — Eisa Elhilo
(74) *Attorney, Agent, or Firm* — Drinker Biddle & Reath LLP

(57) ABSTRACT

Dye mixtures based on dye(s) of formula (1)

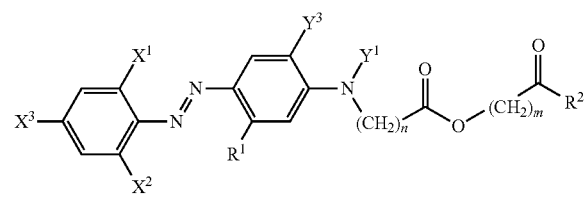

(1)

and dye(s) of formula (2)

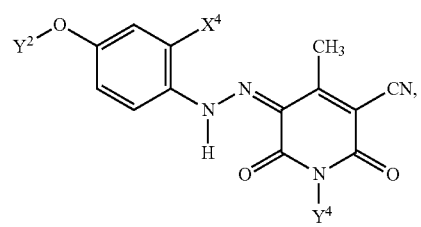

(2)

formula (3)

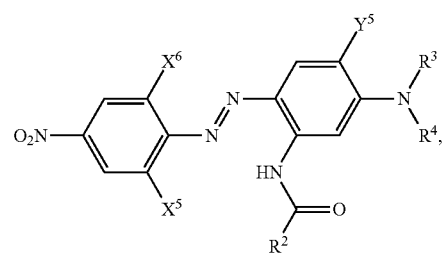

(3)

formula (4)

(Continued)

(4)

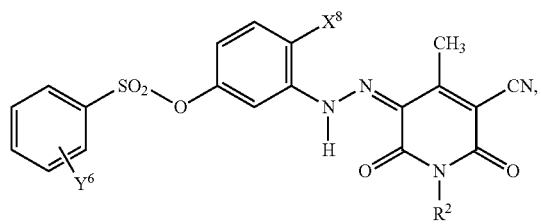

formula (5a)

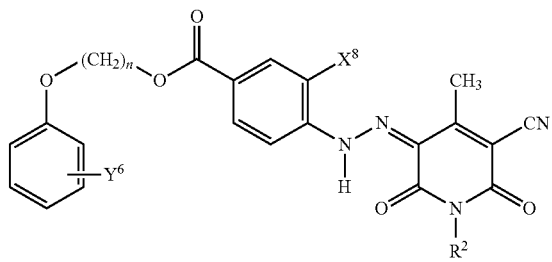

and/or formula (5b)

37 Claims, No Drawings

(51) Int. Cl.
*D06P 3/54* (2006.01)
*C09B 29/36* (2006.01)
*C09B 23/00* (2006.01)
*D06P 3/60* (2006.01)
*D06P 1/18* (2006.01)
*D06P 3/04* (2006.01)

(52) U.S. Cl.
CPC ............... *D06P 3/043* (2013.01); *D06P 3/54* (2013.01); *D06P 3/6041* (2013.01)

(58) Field of Classification Search
USPC ........................................................... 8/639
See application file for complete search history.

(56) References Cited

U.S. PATENT DOCUMENTS

| | | |
|---|---|---|
| 4,348,319 A | 9/1982 | Hamprecht |
| 4,548,613 A | 10/1985 | Bode et al. |
| 4,681,932 A * | 7/1987 | Kruckenberg et al. ............ C09B 29/0081 534/565 |
| 4,734,490 A | 3/1988 | Schwander et al. |
| 5,102,425 A | 4/1992 | Buhler et al. |
| 5,910,624 A | 6/1999 | Wanken et al. |
| 6,008,332 A | 12/1999 | Herzig et al. |
| 6,555,664 B1 | 4/2003 | Lauk et al. |
| 7,824,450 B2 | 11/2010 | Jordan et al. |
| 7,833,291 B2 | 11/2010 | Jordan et al. |
| 2008/0257208 A1* | 10/2008 | Ebenezer et al. ... C09B 67/0058 106/31.48 |
| 2012/0240346 A1 | 9/2012 | Murgatroyd et al. |

FOREIGN PATENT DOCUMENTS

| | | |
|---|---|---|
| CN | 101768375 A | 7/2010 |
| CN | 101955691 A | 1/2011 |
| CN | 101974255 A | 2/2011 |
| CN | 102153890 A | 8/2011 |
| CN | 102391680 A | 3/2012 |
| DE | 27 15 34 C | 3/1914 |
| DE | 26 12 742 A1 | 10/1976 |
| DE | 26 23 251 A1 | 12/1976 |
| DE | 26 10 675 A1 | 9/1977 |
| DE | 29 36 489 A1 | 3/1980 |
| DE | 30 04 655 A1 | 8/1981 |
| DE | 19646429 A1 | 5/1997 |
| DE | 10 2008 054531 A1 | 6/2010 |
| EP | 0 051 563 A1 | 5/1982 |
| EP | 0 161 665 A2 | 11/1985 |
| EP | 0 167 913 A2 | 1/1986 |
| EP | 0 440 072 A1 | 8/1991 |
| EP | 0 667 376 A1 | 8/1995 |
| EP | 0 827 988 A1 | 3/1998 |
| EP | 2 032 524 A1 | 3/2009 |
| GB | 909843 A | 11/1962 |
| GB | 1535334 A | 12/1978 |
| GB | 1536429 A | 12/1978 |
| GB | 2030169 A | 4/1980 |
| GB | 2307479 A | 5/1997 |
| JP | H11158402 A | 6/1999 |
| JP | H11158403 A | 6/1999 |
| WO | WO-97/04031 A1 | 2/1997 |
| WO | WO-00/40656 A1 | 7/2000 |
| WO | WO-02/068539 A1 | 9/2002 |
| WO | WO-02/074864 A1 | 9/2002 |
| WO | WO-2004/044058 A1 | 5/2004 |
| WO | WO-2004056925 A1 | 7/2004 |
| WO | WO-2005/056690 A1 | 6/2005 |
| WO | WO-2006/131530 A1 | 12/2006 |
| WO | WO-2007118818 A1 | 10/2007 |
| WO | WO-2008/049758 A2 | 5/2008 |
| WO | WO-2008074719 A1 | 6/2008 |
| WO | WO-2008/090042 A1 | 7/2008 |
| WO | WO-2009/037215 A2 | 3/2009 |
| WO | WO 2012/095284 A1 * | 7/2012 ............... D06P 3/54 |
| WO | WO-2012095284 A1 | 7/2012 |

OTHER PUBLICATIONS

U.S. Appl. No. 14/760,877, filed Jul. 14, 2015, Vermandel et al.
International Search Report for PCT/EP2014/050067 mailed Jun. 6, 2014.
International Search Report for PCT/EP2014/050069 mailed May 30, 2014.

* cited by examiner

HIGH WET FAST DISPERSE DYE MIXTURES

CROSS-REFERENCE TO RELATED APPLICATIONS

This application is a national stage application (under 35 U.S.C. §371) of PCT/EP2014/050069, filed Jan. 6, 2014, which claims benefit of European Application Nos. 13000169.6, 13151174.3, 13151183.4, all filed Jan. 14, 2013, and 13000205.8 filed Jan. 15, 2013, all of which are incorporated herein by reference in their entirety.

This invention relates to high wet fast disperse azo dye mixtures.

Disperse azo dyes in which the chromophoric system is linked with 2-oxoalkylketo groups are described e.g. in WO 2009/037215, WO 2008/090042, WO 2008/049758, WO 2005/056690 as well as in GB 909 843 and DE 26 12 742. Dye mixtures in Black, Navy and Brown are also well known for example from WO 1997/04031, EP 0 667 376 and JP 11158402 but all have in common unsatisfactory wash- and contact-fastness properties. In addition to that WO 2006/131530 and WO 2012/095284 disclose combinations of dyes similar to those of structure (1) below. DE 10 2008 054531 discloses mixtures of dyes similar to those of structures (2) and (3) below and DE 196 46 429 and U.S. Pat. No. 4,548,613 disclose structures similar to those of structures (5) below.

Surprisingly it has now been found that mixtures of dyes with 2-oxo-alkylketo groups having orange/brown- to red/rubine-shades and selected other azo disperse dyes give improved wash- and contact-fastness properties on polyester and polyester blends especially on polyester-elastane/polyester-spandex. Since some dyes similar to the ones used in the present invention are known for almost 30 years now, it was even more surprising that by selecting, changing and combining dyes it was possible to find new dye mixtures having superior reduction stability, build up- and fastness-properties, in particular dry-heat and sublimation fastness.

The present invention thus is directed to a dye mixture comprising
at least one dye of formula (1)

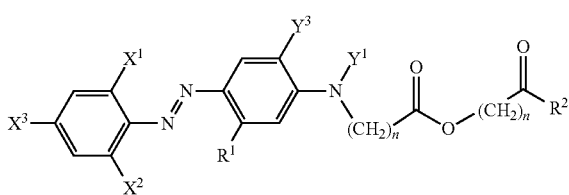

(1)

and
at least one dye or group of dyes selected from the list consisting of a) to f):
a) at least one dye of formula (2)

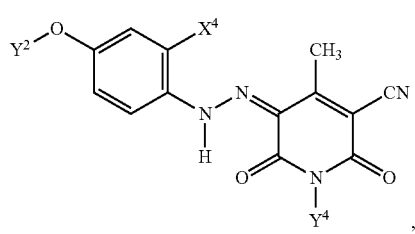

(2)

b) at least two different dyes of formula (3)

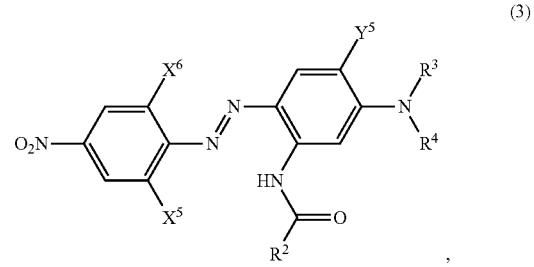

(3)

c) at least one dye of formula (3) and at least one dye of formula (4)

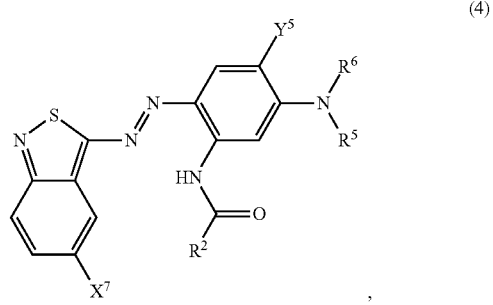

(4)

d) at least two different dyes of formula (3) and at least one dye of formula (4),
e) at least one dye of formula (5a)

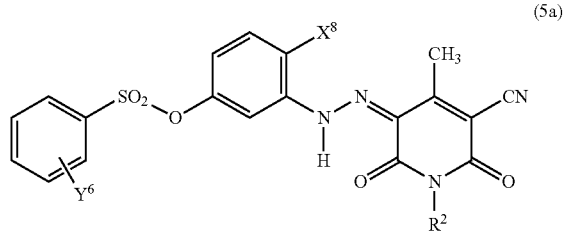

(5a)

f) at least one dye of formula (5b)

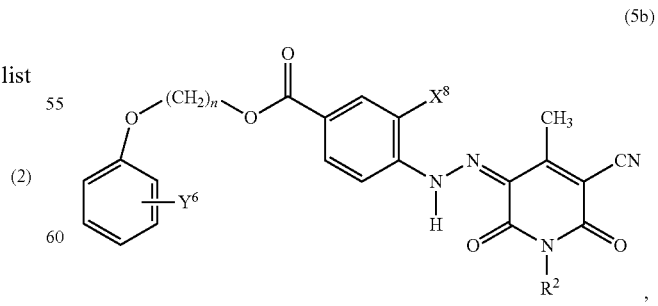

(5b)

wherein independent from each other
$R^1$ is hydrogen, $(C_1\text{-}C_4)$-alkyl or halogen,
$R^2$ is hydrogen or $(C_1\text{-}C_4)$-alkyl, R³ to R⁶ is $(C_1\text{-}C_4)$-alkyl, $(CH_2)_n$—O—$(C_1\text{-}C_4)$-alkyl, $(CH_2)_n$—O—CO—$(C_1\text{-}C_4)$-alkyl, $(CH_2)_n$—COO—$(C_1\text{-}C_4)$-alkyl, $(CH_2)_n$-phenyl or $(CH_2)_n$—COO$(CH_2)_m$—CO—$(C_1\text{-}C_4)$-alkyl, X¹ to X⁸ is hydrogen, halogen, nitro, cyano, SCN, carboxy or CO—NR²R³, Y¹ is hydrogen, $(C_1\text{-}C_4)$-alkyl, substituted $(C_1\text{-}C_4)$-alkyl, $(C_2\text{-}C_4)$-alkenyl or $(CH_2)_m$-phenyl, Y² is phenyl or $(CH_2)_m$-phenyl, both substituted by Y⁶, Y³ is hydrogen or $(C_1\text{-}C_4)$-alkyl, Y⁴ is $(C_1\text{-}C_8)$-alkyl or $(CH_2)_m$-phenyl, Y⁵ is hydrogen, $(C_1\text{-}C_4)$-alkyl or $(C_1\text{-}C_4)$-alkoxy, Y⁶ is hydrogen, nitro, cyano, carboxy, $(C_1\text{-}C_4)$-alkyl or $(C_1\text{-}C_4)$-alkoxy, n and m is 1, 2, 3 or 4.

One preferred embodiment of the invention is a dye mixture as described above, comprising at least one dye of formula (1)

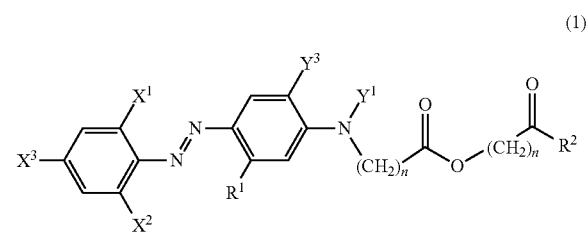

(1)

and at least one dye of formula (2)

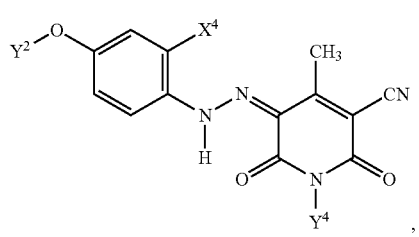

(2)

and optionally one or more dyes selected from the group consisting of dyes of formulae (3), (4), (5a) and (5b)

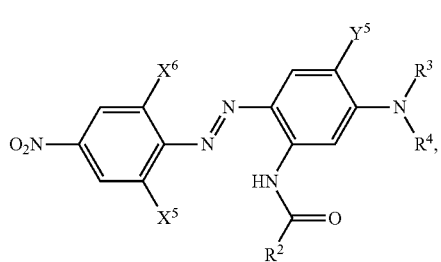

(3)

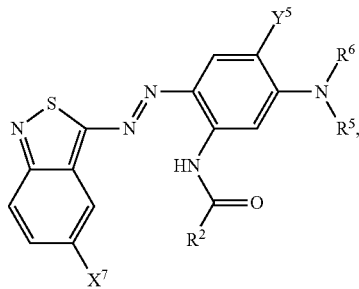

(4)

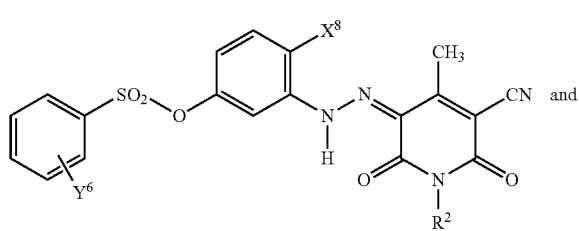

(5a)

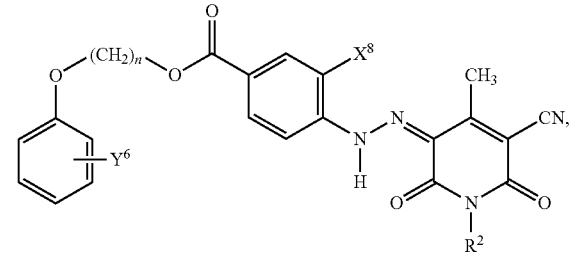

(5b)

wherein independent from each other

R¹ is hydrogen, $(C_1\text{-}C_4)$-alkyl or halogen,

R² is hydrogen or $(C_1\text{-}C_4)$-alkyl,

R³ to R⁶ is $(C_1\text{-}C_4)$-alkyl, $(CH_2)_n$—O—$(C_1\text{-}C_4)$-alkyl, $(CH_2)_n$—O—CO—$(C_1\text{-}C_4)$-alkyl, $(CH_2)_n$—COO—$(C_1\text{-}C_4)$-alkyl, $(CH_2)_n$-phenyl or $(CH_2)_n$—COO $(CH_2)_m$—CO—$(C_1\text{-}C_4)$-alkyl, X¹ to X⁸ is hydrogen, halogen, nitro, cyano, SCN, carboxy or CO—NR²R³, Y¹ is hydrogen, $(C_1\text{-}C_4)$-alkyl, substituted $(C_1\text{-}C_4)$-alkyl, $(C_2\text{-}C_4)$-alkenyl or $(CH_2)_m$-phenyl, Y² is phenyl or $(CH_2)_m$-phenyl, both substituted by Y⁶, Y³ is hydrogen or $(C_1\text{-}C_4)$-alkyl, Y⁴ is $(C_1\text{-}C_8)$-alkyl or $(CH_2)_m$-phenyl, Y⁵ is hydrogen, $(C_1\text{-}C_4)$-alkyl or $(C_1\text{-}C_4)$-alkoxy, Y⁶ is hydrogen, nitro, cyano, carboxy, $(C_1\text{-}C_4)$-alkyl or $(C_1\text{-}C_4)$-alkoxy, n and m is 1, 2, 3 or 4.

There also exist preferred dye mixtures and thus a dye mixture as described above, wherein independent from each other R¹ is hydrogen or $(C_1\text{-}C_2)$-alkyl, R² is $(C_1\text{-}C_2)$-alkyl, R³ to R⁶ is $(C_1\text{-}C_2)$-alkyl, $(CH_2)_n$-phenyl, $(CH_2)_n$—COO—$(C_1\text{-}C_2)$-alkyl or $(CH_2)_n$—COO$(CH_2)_m$—CO—$(C_1\text{-}C_2)$-alkyl, X¹ and X² are hydrogen, bromo, chloro, nitro or cyano, X³ and X⁷ are nitro or cyano, X⁴ is hydrogen, nitro or cyano, X⁵ and X⁶ are hydrogen, bromo, chloro, nitro or cyano, X⁸ is hydrogen, nitro or cyano, Y¹ is $(C_1\text{-}C_4)$-alkyl or $(CH_2)_m$-phenyl, $Y^2$ is phenyl or $(CH_2)_m$-phenyl,
$Y^3$ is hydrogen, or $(C_1-C_2)$-alkyl,
$Y^4$ is $(C_1-C_8)$-alkyl or $(CH_2)_m$-phenyl,
$Y^5$ is hydrogen, $(C_1-C_2)$-alkyl or $(C_1-C_2)$-alkoxy,
n and m is 1 or 2
is preferred.

Even more preferred is a dye mixture as described above, wherein independent from each other
$R^1$ is hydrogen or methyl,
$R^2$ is methyl or ethyl,
$R^3$ to $R^6$ is $(C_1-C_2)$-alkyl, $(CH_2)_n$-phenyl, $(CH_2)_n$—COO—$(C_1-C_2)$-alkyl or $(CH_2)_n$—COO$(CH_2)_m$—CO—$(C_1-C_2)$-alkyl,
$X^1$ and $X^2$ are hydrogen, bromo, chloro, nitro or cyano,
$X^3$, $X^4$ and $X^7$ are nitro,
$X^5$ and $X^6$ are hydrogen, bromo, chloro, nitro or cyano,
$X^8$ is hydrogen,
$Y^1$ and $Y^2$ are $(CH_2)_m$-phenyl,
$Y^3$ is hydrogen or methyl,
$Y^4$ is $(C_1-C_8)$-alkyl or $(CH_2)_m$-phenyl,
$Y^5$ is hydrogen, O-methyl or O-ethyl,
n and m is 1 or 2.

Most preferred, however, is a dye mixture as described above, wherein independent from each other
$R^1$ is hydrogen,
$R^2$ is methyl or ethyl,
$R^3$ to $R^6$ is $(C_1-C_2)$-alkyl, $(CH_2)_n$-phenyl, $(CH_2)_n$—COO—$(C_1-C_2)$-alkyl or $(CH_2)_n$—COO$(CH_2)_m$—CO—$(C_1-C_2)$-alkyl,
$X^1$ and $X^2$ are hydrogen, bromo, chloro, nitro or cyano,
$X^3$, $X^4$ and $X^7$ are nitro,
$X^5$ and $X^6$ are hydrogen, bromo, chloro, nitro or cyano,
$X^8$ is hydrogen,
$Y^1$ and $Y^2$ are $(CH_2)_m$-phenyl,
$Y^3$ is hydrogen,
$Y^4$ is $(C_1-C_4)$-alkyl,
$Y^5$ is hydrogen or O-methyl,
n and m is 1 or 2.

Besides from dye mixtures consisting of dyes of formula (1) and (2) and mixtures comprising dyes of formula (1) and (2) and additional dyes not mentioned above as shading components there exist a couple of inventive dye mixtures having specific combinations of dyes—all of which form aspects of the present invention.

Preferred is e.g. a dye mixture as described above, comprising at least one dye selected from the group consisting of dyes of formulae (3), (4), (5a) and (5b).

Also preferred is a dye mixture as described above, comprising at least two dyes of formula (3).

And also a dye mixture as described above, comprising at least two dyes of formula (3) and at least one dye selected from the group consisting of dyes of formulae (4), (5a) and (5b) is preferred.

Another preferred embodiment for use as Navy and Black dyes is a dye mixture comprising
at least one dye selected from the group consisting of dyes of formula (3) and (4)

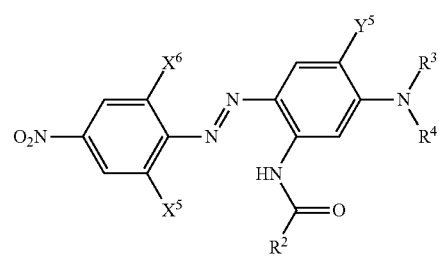

(3)

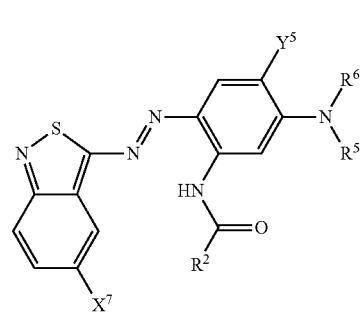

and (4)

and at least one dye of formula (1)

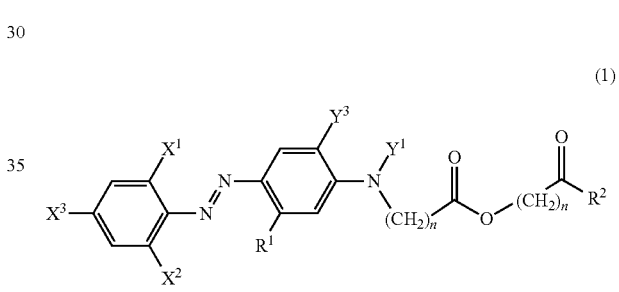

(1)

and optionally one or more dyes selected from the group consisting of dyes of formulae (2), (5a) and (5b),

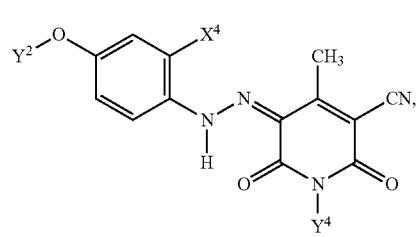

(2)

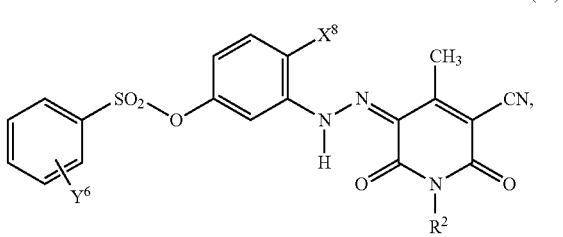

(5a)

-continued (5b)

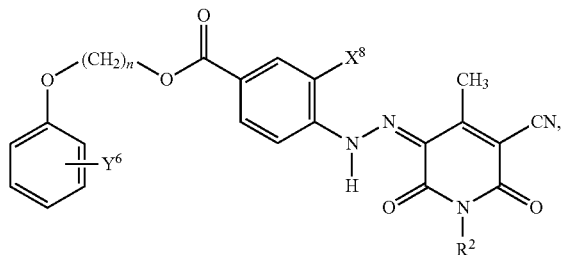

wherein independent from each other
$R^1$ is hydrogen, $(C_1-C_4)$-alkyl or halogen,
$R^2$ is hydrogen or $(C_1-C_4)$-alkyl,
$R^3$ to $R^6$ is $(C_1-C_4)$-alkyl, $(CH_2)_n$—O—$(C_1-C_4)$-alkyl, $(CH_2)_n$—O—CO—$(C_1-C_4)$-alkyl, $(CH_2)_n$—COO—$(C_1-C_4)$-alkyl, $(CH_2)_n$-phenyl or $(CH_2)_n$—COO$(CH_2)_m$—CO—$(C_1-C_4)$-alkyl,
$X^1$ to $X^8$ is hydrogen, halogen, nitro, cyano, SCN, carboxy or CO—$NR^2R^3$,
$Y^1$ is hydrogen, $(C_1-C_4)$-alkyl, substituted $(C_1-C_4)$-alkyl, $(C_2-C_4)$-alkenyl or $(CH_2)_m$-phenyl,
$Y^2$ is phenyl or $(CH_2)_m$-phenyl, both substituted by $Y^6$,
$Y^3$ is hydrogen or $(C_1-C_4)$-alkyl,
$Y^4$ is $(C_1-C_8)$-alkyl or $(CH_2)_m$-phenyl,
$Y^5$ is hydrogen, $(C_1-C_4)$-alkyl or $(C_1-C_4)$-alkoxy,
$Y^6$ is hydrogen, nitro, cyano, carboxy, $(C_1-C_4)$-alkyl or $(C_1-C_4)$-alkoxy,
n and m is 1, 2, 3 or 4.

Also for this preferred embodiment there exist preferred mixtures and a dye mixture as described above, wherein independent from each other
$R^1$ is hydrogen or $(C_1-C_2)$-alkyl,
$R^2$ is $(C_1-C_2)$-alkyl,
$R^3$ to $R^6$ is $(C_1-C_2)$-alkyl, $(CH_2)_n$-phenyl, $(CH_2)_n$—COO—$(C_1-C_2)$-alkyl or $(CH_2)_n$—COO$(CH_2)_m$—CO—$(C_1-C_2)$-alkyl,
$X^1$ and $X^2$ are hydrogen, bromo, chloro, nitro or cyano,
$X^3$ and $X^7$ are nitro or cyano,
$X^4$ is hydrogen, nitro or cyano,
$X^5$ and $X^6$ are hydrogen, bromo, chloro, nitro or cyano,
$X^8$ is hydrogen, nitro or cyano,
$Y^1$ is $(C_1-C_4)$-alkyl or $(CH_2)_m$-phenyl,
$Y^2$ is phenyl or $(CH_2)_m$-phenyl,
$Y^3$ is hydrogen, or $(C_1-C_2)$-alkyl,
$Y^4$ is $(C_1-C_8)$-alkyl or $(CH_2)_m$-phenyl,
$Y^5$ is hydrogen, $(C_1-C_2)$-alkyl or $(C_1-C_2)$-alkoxy,
n and m is 1 or 2
is preferred.

Even more preferred is a dye mixture as described above, wherein independent from each other
$R^1$ is hydrogen or methyl,
$R^2$ is methyl or ethyl,
$R^3$ to $R^6$ is $(C_1-C_2)$-alkyl, $(CH_2)_n$-phenyl, $(CH_2)_n$—COO—$(C_1-C_2)$-alkyl or $(CH_2)_n$—COO$(CH_2)_m$—CO—$(C_1-C_2)$-alkyl,
$X^1$ and $X^2$ are hydrogen, bromo, chloro, nitro or cyano,
$X^3$, $X^4$ and $X^7$ are nitro,
$X^5$ and $X^6$ are hydrogen, bromo, chloro, nitro or cyano,
$X^8$ is hydrogen,
$Y^1$ and $Y^2$ are $(CH_2)_m$-phenyl,
$Y^3$ is hydrogen or methyl,
$Y^4$ is $(C_1-C_8)$-alkyl or $(CH_2)_m$-phenyl,
$Y^5$ is hydrogen, O-methyl or O-ethyl,
n and m is 1 or 2.

Most preferred, however, is a dye mixture as described above, wherein independent from each other
$R^1$ is hydrogen,
$R^2$ is methyl or ethyl,
$R^3$ to $R^6$ is $(C_1-C_2)$-alkyl, $(CH_2)_n$-phenyl, $(CH_2)_n$—COO—$(C_1-C_2)$-alkyl or $(CH_2)_n$—COO$(CH_2)_m$—CO—$(C_1-C_2)$-alkyl,
$X^1$ and $X^2$ are hydrogen, bromo, chloro, nitro or cyano,
$X^3$, $X^4$ and $X^7$ are nitro,
$X^5$ and $X^6$ are hydrogen, bromo, chloro, nitro or cyano,
$X^8$ is hydrogen,
$Y^1$ and $Y^2$ are $(CH_2)_m$-phenyl,
$Y^3$ is hydrogen,
$Y^4$ is $(C_1-C_4)$-alkyl,
$Y^5$ is hydrogen or O-methyl,
n and m is 1 or 2.

Besides from dye mixtures consisting of dyes of formula (3) and/or (4) and (1) and mixtures comprising dyes of formula (3) and/or (4) and (1) and additional dyes not mentioned above as shading components there exist a couple of inventive dye mixtures having specific combinations of dyes—all of which form aspects of the present invention.

Preferred is e.g. a dye mixture as described above, comprising at least two dyes of formula (3).

Also preferred is a dye mixture as described above, comprising at least one dye of formula (2).

And also a dye mixture as described above, comprising at least one dye of formulae (4) and (5a) or of formulae (4) and (5b) is preferred.

Still another preferred embodiment is a dye mixture for use as Brown dye. This being a dye mixture comprising
at least one dye of formula (1)

(1)

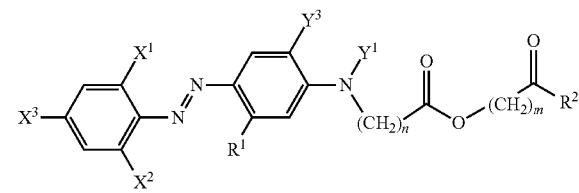

and one or more dyes selected from the group consisting of dyes of formulae (2), (5a) and (5b), (2)

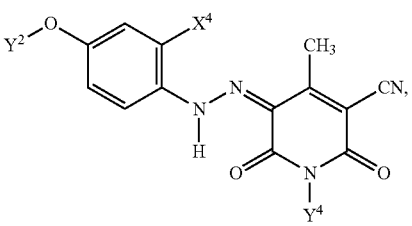

(5a)

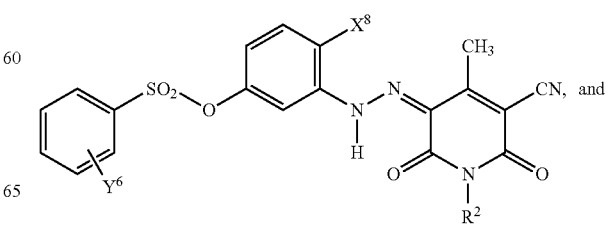

-continued (5b)

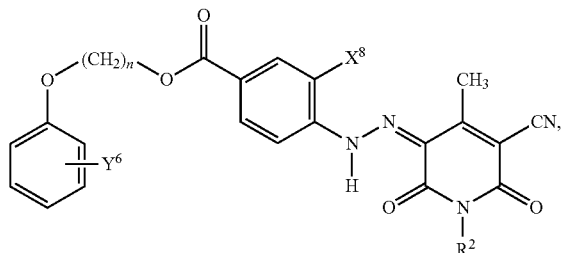

wherein independent from each other
$R^1$ is hydrogen, $(C_1-C_4)$-alkyl or halogen,
$R^2$ is hydrogen or $(C_1-C_4)$-alkyl,
$X^1$ to $X^8$ is hydrogen, halogen, nitro, cyano, SCN, carboxy or $CO-NR^2R^2$,
$Y^1$ is hydrogen, $(C_1-C_4)$-alkyl, substituted $(C_1-C_4)$-alkyl, $(C_2-C_4)$-alkenyl or $(CH_2)_m$-phenyl,
$Y^2$ is phenyl or $(CH_2)_m$-phenyl, both substituted by $Y^6$,
$Y^3$ is hydrogen or $(C_1-C_4)$-alkyl,
$Y^4$ is $(C_1-C_8)$-alkyl or $(CH_2)_m$-phenyl,
$Y^6$ is hydrogen, nitro, cyano, carboxy, $(C_1-C_4)$-alkyl or $(C_1-C_4)$-alkoxy,
n and m is 1, 2, 3 or 4.

There also exist preferred dye mixtures and thus a dye mixture as described above, wherein independent from each other
$R^1$ is hydrogen or $(C_1-C_2)$-alkyl,
$R^2$ is $(C_1-C_2)$-alkyl,
$X^1$ and $X^2$ are hydrogen, bromo, chloro, nitro or cyano,
$X^3$ is nitro or cyano,
$X^4$ and $X^8$ are hydrogen, nitro or cyano,
$Y^1$ is $(C_1-C_4)$-alkyl or $(CH_2)_m$-phenyl,
$Y^2$ is phenyl or $(CH_2)_m$-phenyl,
$Y^3$ is hydrogen, or $(C_1-C_2)$-alkyl,
$Y^4$ is $(C_1-C_8)$-alkyl,
n and m is 1 or 2
is preferred.

Even more preferred is a dye mixture as described above, wherein independent from each other
$R^1$ is hydrogen or methyl,
$R^2$ is methyl or ethyl,
$X^1$ and $X^2$ are hydrogen, bromo, chloro, nitro or cyano,
$X^3$, and $X^4$ are nitro,
$X^8$ is hydrogen,
$Y^1$ and $Y^2$ are $(CH_2)_m$-phenyl,
$Y^3$ is hydrogen or methyl,
$Y^4$ is $(C_1-C_8)$-alkyl,
n and m is 1 or 2.

Most preferred, however, is a dye mixture as described above, wherein independent from each other
$R^1$ is hydrogen,
$R^2$ is methyl or ethyl,
$X^1$ and $X^2$ are hydrogen, bromo, chloro, nitro or cyano,
$X^3$, and $X^4$ are nitro,
$X^8$ is hydrogen,
$Y^1$ and $Y^2$ are $(CH_2)_m$-phenyl,
$Y^3$ is hydrogen,
$Y^4$ is $(C_1-C_4)$-alkyl,
n and m is 1 or 2.

Besides from dye mixtures consisting of dyes of formula (1) and [(2) and/or (5a) and/or (5b)] also mixtures comprising dyes of formula (1) and [(2) and/or (5a) and/or (5b)] and additional dyes not mentioned above as shading components form aspects of the present invention.

Of particular interest is
a dye mixture as described above, comprising at least one dye of formula (2),
a dye mixture as described above, comprising at least one dye of formula (5a) and
a dye mixture as described above, comprising at least one dye of formula (5b).

As already mentioned all these dye mixtures may be used as such, i.e. may consist of the dyes mentioned above or may also comprise other dyes as shading components.

The dyes of formula (1) to (5) are known and can be prepared according to known procedures, for example from the documents:
EP 0 167 913, DE 26 10 675, DE 29 36 489, EP 0 161 665, JP 11158403, DE 19 646 429 and EP 0 440 072.

The general process for the production of a dye mixture as described above comprising
a) mixing dye(s) of formula (1) with the required amount of dye(s) according to formulae (2), (3), (4), (5a) and/or (5b),
b) homegenizing the mixture obtained in step a).

forms another aspect of the present invention.

A process for the production of a dye mixture as described above, comprising
a) mixing the components (1), (2) and optionally (3) to (5b),
b) homegenizing the mixture obtained in step a) forms still another aspect of the present invention.

Yet another aspect of the present invention is a process for the production of a dye mixture as described above, comprising
a) mixing the components (3) and/or (4) and (1) and optionally (2) and/or (5),
b) homegenizing the mixture obtained in step a).

Still another aspect of the present invention is a process for the production of a dye mixture as described above, comprising
a) mixing the components (1), and [(2) and/or (5a) and/or (5b)],
b) homegenizing the mixture obtained in step a).

Ranges of weight % of the components of the inventive dye mixtures for preferred colors are e.g.:

| | Black/Navy |
|---|---|
| 1: | 0-60 |
| 2: | 0-60 |
| 3: | 0-85 |
| 4: | 0-80 |
| 5a and/or 5b: | 0-20 with the proviso that at least one of (3) and (4) is not 0 | and more preferred:

| | Black/Navy |
|---|---|
| 1: | 5-50 |
| 2: | 5-50 |
| 3: | 0-85 |
| 4: | 0-80 |
| 5a and/or 5b: | 0-20 with the proviso that at least one of (3) and (4) is not 0. |

Also for Brown shades preferred mixtures exist:

| | Brown |
|---|---|
| 1: | 20-90 |
| 2: | 0-90 |
| 3: | — |
| 4: | — |
| 5a and/or 5b: | 0-50 with the proviso, that at least one of 2, 5a and 5b is not 0 | and even more preferred are mixtures having:

| | Brown |
|---|---|
| 1: | 20-80 |
| 2: | 20-80 |
| 3: | — |
| 4: | — |
| 5a and/or 5b: | 0-50. |

In each dye mixture the components 1 to 5b add up to 100% in case the dye mixture consists of the dyes mentioned above or to less than 100% in case additional dyes are added e.g. as shading components. In such a case the amount of shading components preferably is less than 10, more preferred less than 5 and most preferred less than 2 weight % based on the weight of all dyes of the dye mixture.

When the dye mixture of the present invention is used in dyeing, the dye mixture is dispersed in an aqueous medium by means of a dispersing agent and wetting agent in the usual way to prepare a dye bath for dyeing or a printing paste for textile printing. Thus also an aqueous solution for dying comprising a dye mixture as described above forms an aspect of the present invention. And also the use of a dye mixture as described above and/or an aqueous solution as described above for dying fibers, as well as blends of such fibres selected from the group consisting of: synthetic fibers: nylon, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers and Lyocell fibers forms an aspect of the invention.

Typical examples of dispersing agent are lignosulphonates, naphthalene sulphonic acid/formaldehyde condensates and phenol/cresol/sulphanilic acid/formaldehyde condensates, typical examples of wetting agent are alkyl aryl ethoxylates which may be sulphonated or phosphated and typical example of other ingredients which may be present are inorganic salts, de-dusting agents such as mineral oil or nonanol, organic liquids and buffers. Dispersing agents may be present at from 30 to 500% based on the weight of the dye mixture. Dedusting agents may be used at from 0 to 5% based on the weight of the dye mixture.

A process for dyeing or printing carboxamido- and/or hydroxyl-containing material, comprising contacting the carboxamido- and/or hydroxyl-containing material with a dye mixture as described above and/or an aqueous solution as described above forms yet another aspect of the present invention.

For example, in the case of dyeing polyester fibres and fibre mixture products such as blended yarn fabrics of union cloth product comprising polyester fibres can be dyed with good colour fastness by common dyeing methods, such as a high temperature dyeing method, a carrier dyeing method and a thermosol dyeing method. In some cases, the addition of an acid substance to the dye bath may result in even more successful dyeing.

Suitable process conditions may be selected from the following:
(i) exhaust dyeing at a pH of from 4 to 8.5, at a temperature of from 125 to 140° C. for from 10 to 120 minutes and under a pressure of from 1 to 2 bar, a sequestrant optionally being added;
(ii) continuous dyeing at a pH of from 4 to 8.5, at a temperature of from 190 to 225° C. for from 15 seconds to 5 minutes, a migration inhibitor optionally being added;
(iii) direct printing at a pH of from 4 to 6.5, at a temperature of from 160 to 185° C. for from 4 to 15 minutes for high temperature steaming, or at a temperature of from 190 to 225° C. for from 15 seconds to 5 minutes for bake fixation with dry heat or at a temperature of from 120 to 140° C. and 1 to 2 bar for from 10 to 45 minutes for pressure steaming, wetting agents and thickeners (such as alginates) of from 5 to 100% by weight of the dye optionally being added;
(iv) discharge printing (by padding the dye on to the textile material, drying and overprinting) at a pH of from 4 to 6.5, migration inhibitors and thickeners optionally being added;
(v) carrier dyeing at a pH of from 4 to 7.5, at a temperature of from 95 to 100° C. using a carrier such as methylnaphthalene, diphenylamine or 2-phenylphenol, sequestrants optionally being added; and
(vi) atmospheric dyeing of acetate, triacetate and nylon at a pH of from 4 to 7.5, at a temperature of about 85° C. for acetate or at a temperature of about 90° C. for triacetate and nylon for from 15 to 90 minutes, sequestrants optionally being added.

In all the above processes, the dye mixture is applied as a dispersion comprising from 0.001 to 20 wt. %, preferably from 0.005 to 16 wt. %, of the inventive dye mixture in an aqueous medium.

In addition to the above-mentioned application processes, the dye mixture may be applied to synthetic textile materials and fibre blends by ink-jet printing, the substrates optionally having been pre-treated to aid printing.

An ink for digital textile printing, comprising a dye mixture as described above is another aspect of the present invention.

For ink-jet applications, the application medium may comprise water and a water-soluble organic solvent, preferably in a weight ratio of 1:99 to 99:1, more preferably 1:95 to 50:50 and especially in the range 10:90 to 40:60. The water-soluble organic solvent preferably comprises a $C_1$-$C_4$-alkanol, especially methanol or ethanol, a ketone, especially acetone or methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

The dyestuff may also be applied to textile materials using supercritical carbon dioxide, in which case the dye formulating agents may optionally be omitted.

The synthetic textile material may preferably be selected from aromatic polyester, especially polyethylene terephthalate, polyamide, especially polyhexamethylene adipamide, secondary cellulose acetate, cellulose triacetate, and natural textile materials, especially cellulosic materials and wool. An especially preferred textile material is an aromatic polyester or fibre blend thereof with fibres of any of the above mentioned textile materials. Especially preferred fibre blends include those of polyester-cellulose, such as polyester-cotton, and polyester-wool. The textile materials or blends thereof may be in the form of filaments, loose fibres, yarn or woven or knitted fabrics.

Particularly, among polyester fibres, not only ordinary polyester fibres (regular denier fibres) but also microfibres (fine denier fibres, which are less than 0.6 denier) may be used as fibres which can successfully be dyed with the dye mixture of the present invention.

In general all kinds of fibers can be dyed and therefore fiber and blends containing such fiber selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers comprising a dye mixture as described above either in chemically and/or physically bound form forms/form another aspect of the present invention.

The examples which follow serve to illustrate the invention. Parts and percentages are by weight unless noted otherwise. The relationship of parts by weight to parts by volume is that of the kilogram to the liter.

EXAMPLES

Example 1

15 parts dye of the formula (1-1)

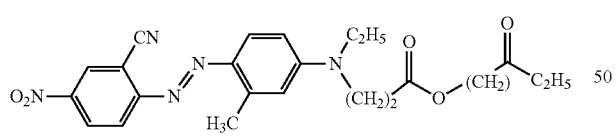

(1-1)

were mixed with 30 parts of a dye of the formula (2-1)

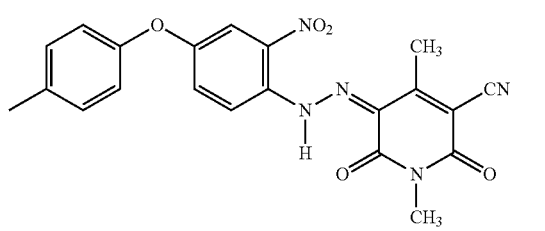

(2-1)

and mixed with 55 parts of a dye powder of the formula (3-1)

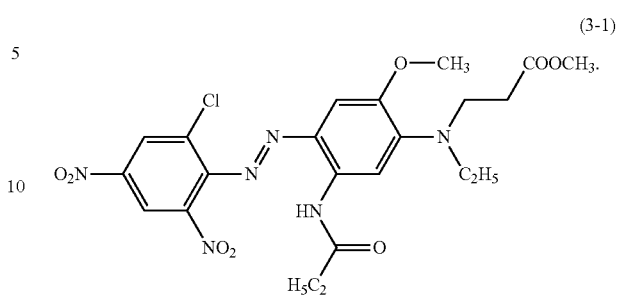

(3-1)

The resulting dye mixture of the invention was formulated using dispersing agent and dried via spray drying and gives deep black dyeings and prints, on polyester or polyester blends using dyeing conditions typical for disperse dyes.

Example 2

20 parts dye of the formula (1-2)

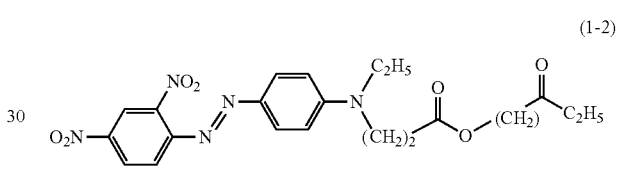

(1-2)

were mixed with 24 parts of a dye of the formula (2-2)

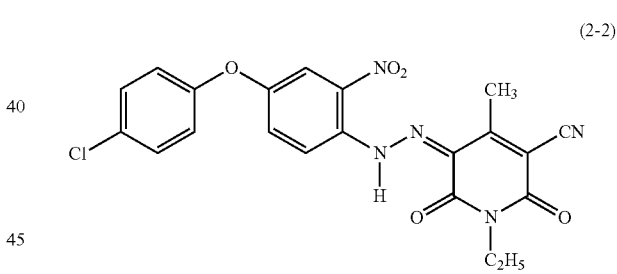

(2-2)

and mixed with 56 parts of a dye powder of the formula (4-1)

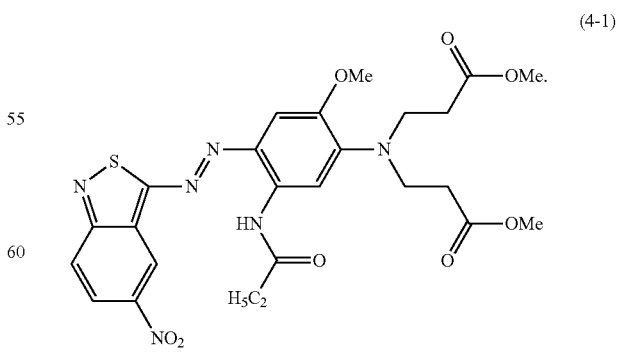

(4-1)

The resulting inventive dye mixture was formulated using dispersing agent and dried via spray drying and gives deep black dyeings and prints e.g. on polyester or polyester blends when used under the dyeing conditions typical for disperse dyes.

Example 3

20 parts dye of the formula (1-3)

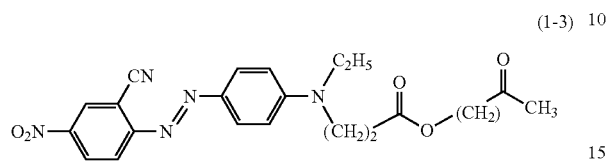
(1-3)

were mixed with 22 parts of a dye of the formula (2-3)

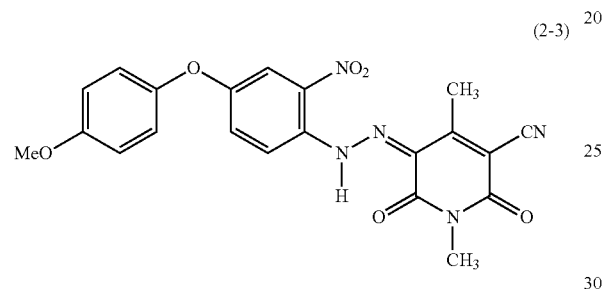
(2-3)

and mixed with 26 parts of a dye powder of the formula (3-2)

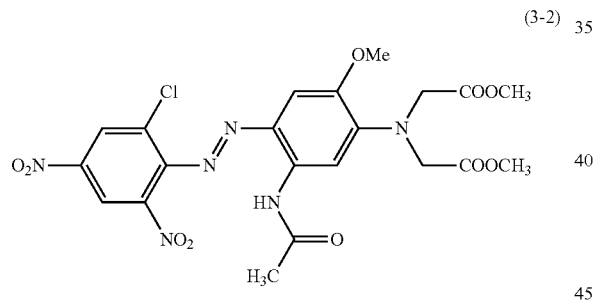
(3-2)

and mixed with 32 parts of a dye powder of the formula (4-2)

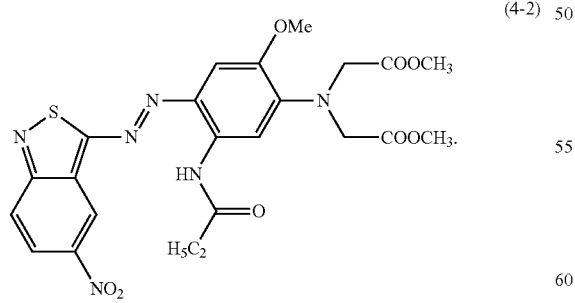
(4-2)

The resulting dye mixture of the invention was formulated using dispersing agent and dried via spray drying and gives deep black dyeings or prints, on polyester or polyester blends for example when applying the dyeing conditions typical for disperse dyes.

Example 4

18 parts dye of the formula (1-4)

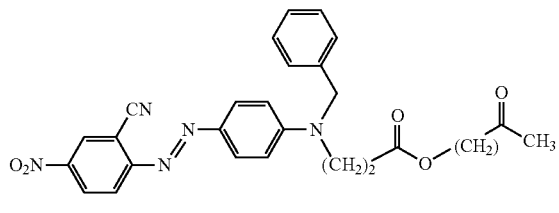
(1-4)

were mixed with 20 parts of a dye of the formula (2-4)

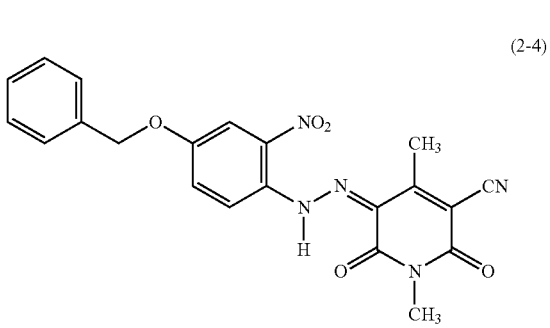 [SMILES: CC1=C(C#N)C(=O)N(C)C(=O)/C1=N\Nc1ccc(OCc2ccccc2)cc1[N+](=O)[O-]]
(2-4)

and mixed with 32 parts of a dye powder of the formula (3-3)

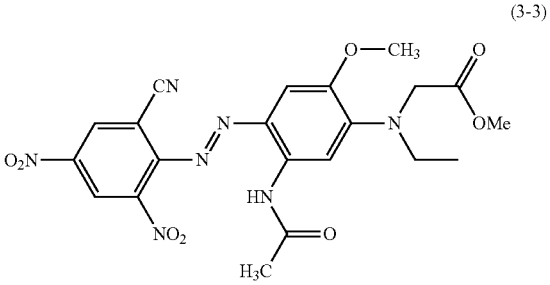 [SMILES: CCN(CC(=O)OC)c1cc(NC(C)=O)c(/N=N/c2c(C#N)cc([N+](=O)[O-])cc2[N+](=O)[O-])cc1OC]
(3-3)

and mixed with 22 parts of a dye powder of the formula (3-4)

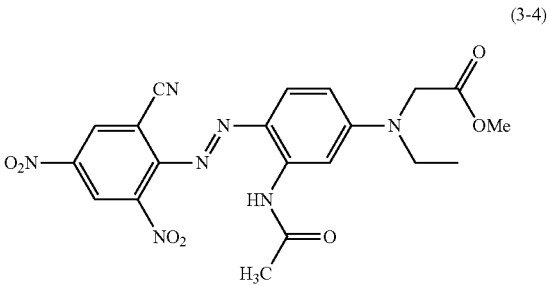 [SMILES: CCN(CC(=O)OC)c1ccc(/N=N/c2c(C#N)cc([N+](=O)[O-])cc2[N+](=O)[O-])c(NC(C)=O)c1]
(3-4)

and mixed with 8 parts of a dye powder of the formula (5a-1)

(5a-1)

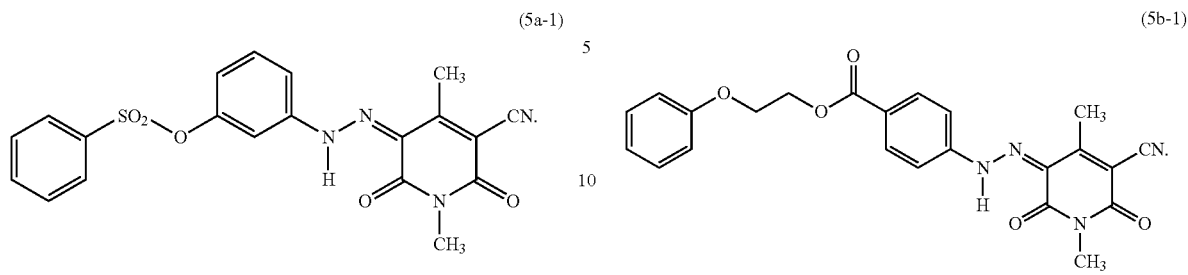

The resulting inventive dye mixture was formulated using dispersing agent and dried via spray drying and gives deep black dyeings and prints e.g. on polyester or polyester blends under the dyeing conditions typical for disperse dyes.

Example 5

25 parts dye of the formula (1-4)

(1-4)

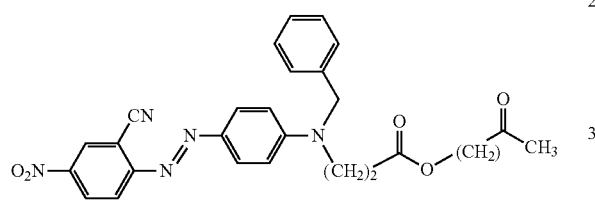

were mixed with 20 parts of a dye of the formula (2-4)

(2-4)

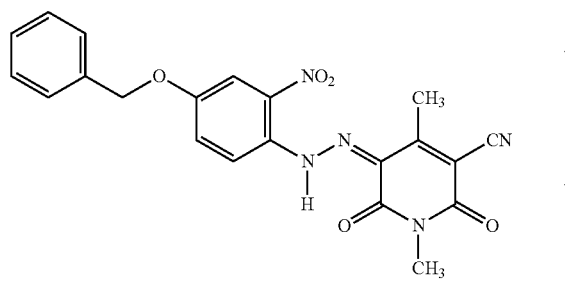

and mixed with 49 parts of a dye powder of the formula (4-3)

(4-3)

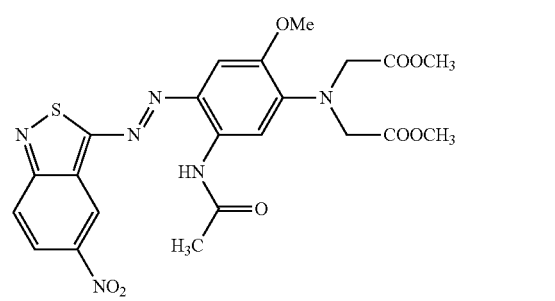

and mixed with 6 parts of a dye powder of the formula (5b-1)

(5b-1)

The resulting dye mixture of the invention was formulated using dispersing agent and dried via spray drying and gives deep black dyeings and prints, on polyester or polyester blends for example, under the dyeing conditions typical for disperse dyes.

Example 6

18 parts dye of the formula (1-4)

(1-4)

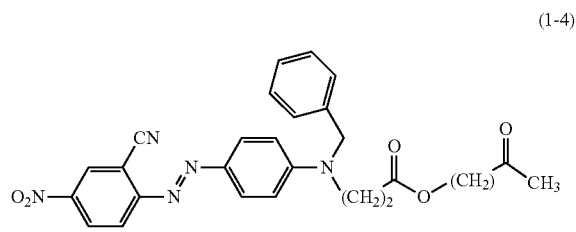

were mixed with 17 parts of a dye of the formula (2-4)

(2-4)

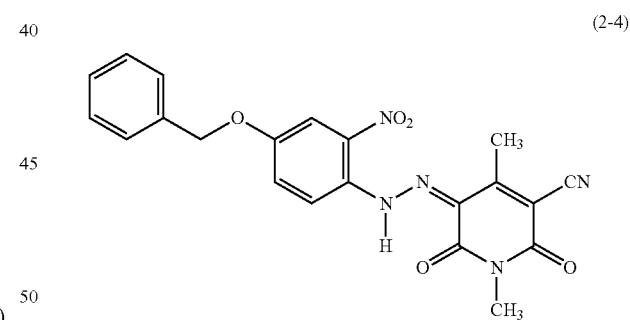

and mixed with 25 parts of a dye powder of the formula (3-3)

(3-3)

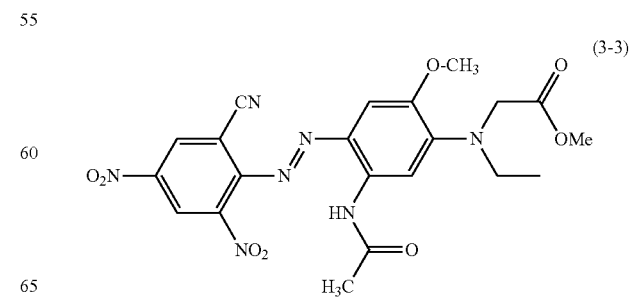

and mixed with 32 parts of a dye powder of the formula (3-5)

(3-5)
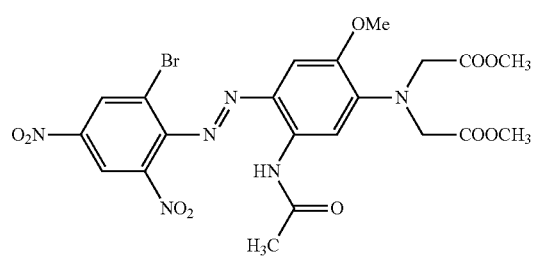

and mixed with 8 parts of a dye powder of the formula (5a-1)

(5a-1)
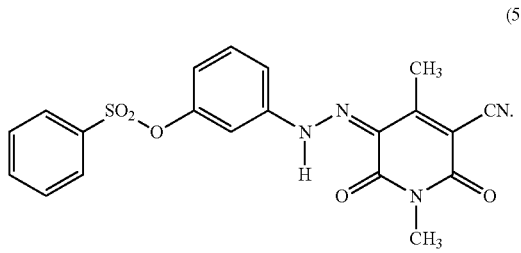

The resulting inventive dye mixture was formulated using dispersing agent and dried via spray drying and gives deep black dyeings or prints both on polyester or polyester blends for example using the dyeing conditions typical for disperse dyes.

Example 7

29 parts dye of the formula (1-4)

(1-4)
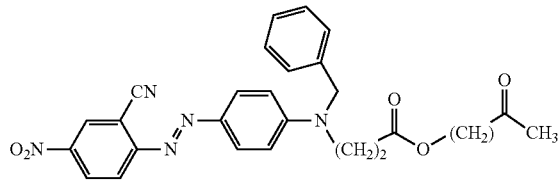

were mixed with 34 parts of a dye of the formula (2-5)

(2-5)
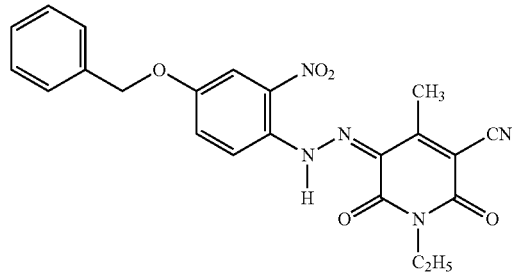

and mixed with 37 parts of a dye powder of the formula (5b-1)

(5b-1)
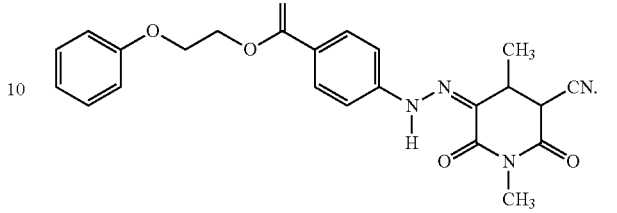

The resulting dye mixture of the invention was formulated using dispersing agent and dried via spray drying and gives deep brown dyeings or prints, on polyester or polyester blends for example, under the dyeing conditions typical for disperse dyes.

Example 8

21 parts dye of the formula (1-6)

(1-6)
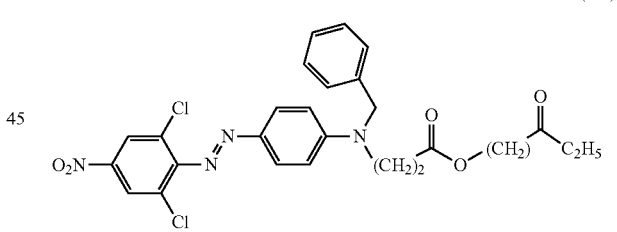

and 47 parts of a dye powder of the formula (1-7)

(1-7)
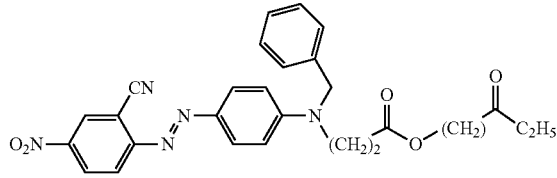

were mixed with 32 parts of a dye of the formula (2-6)

(2-6)
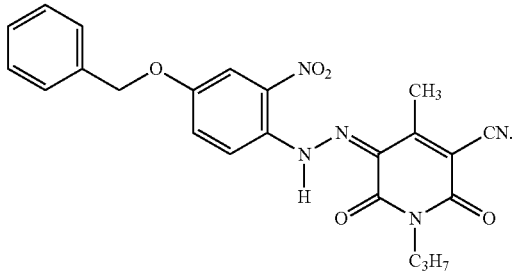

The resulting dye mixture of the invention was formulated using dispersing agent and dried via spray drying and gives deep brown dyeings or prints, on polyester or polyester blends both e.g. under the dyeing conditions typical for disperse dyes.

Example 9

45 parts dye of the formula (1-7)

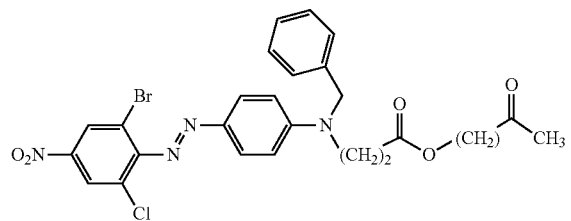
(1-7)

were mixed with 55 parts of a dye of the formula (3-5)

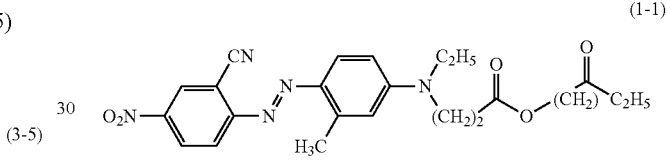
(3-5)

The resulting dye mixture of the invention was formulated using dispersing agent and dried via spray drying and gives deep black dyeings or prints, on polyester or polyester blends for example, under the dyeing conditions typical for disperse dyes.

Example 10

25 parts dye of the formula (1-4)

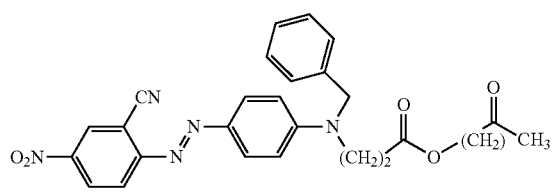
(1-4)

and mixed with 75 parts of a dye powder of the formula (4-3)

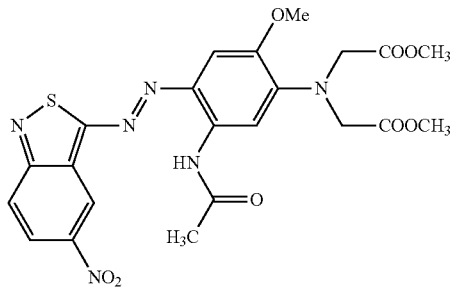
(4-3)

The resulting dye mixture of the invention was formulated using dispersing agent and dried via spray drying and gives deep black dyeings or prints, on polyester or polyester blends for example, under the dyeing conditions typical for disperse dyes.

Example 11

31 parts dye of the formula (1-1)

(1-1)

were mixed with 69 parts of a dye of the formula (2-1)

(2-1)

The resulting dye mixture of the invention was formulated using dispersing agent and dried via spray drying and gives deep brown dyeings and prints, both on polyester or polyester blends for example, under the dyeing conditions typical for disperse dyes.

Example 12

75 parts dye of the formula (1-2)

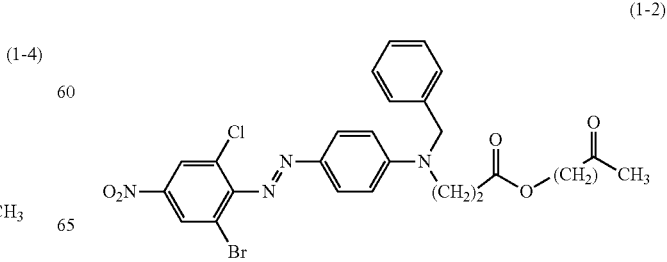
(1-2)

were mixed with 20 parts of a dye of the formula (2-2)

(2-2)

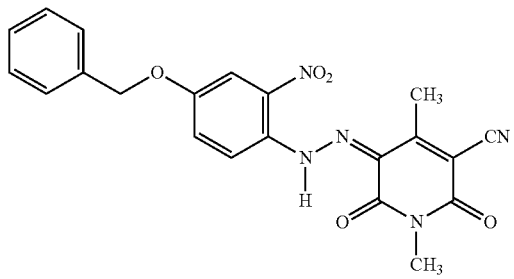

and mixed with 5 parts of a dye powder of the formula (5a-1)

(5a-1)

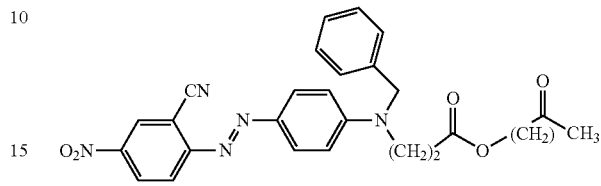

The resulting dye mixture of the invention was formulated using dispersing agent and dried via spray drying and gives yellow brown dyeings and prints, on polyester or polyester blends for example, under the dyeing conditions typical for disperse dyes.

Example 13

85 parts dye of the formula (1-3)

(1-3)

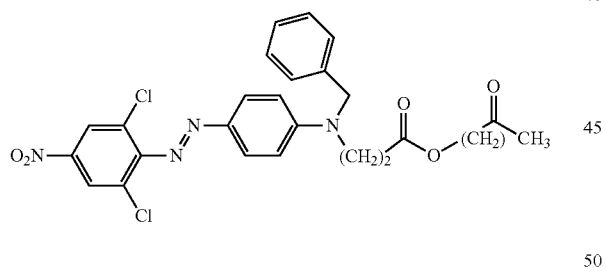

were mixed with 15 parts of a dye powder of the formula (5b-1)

(5b-1)

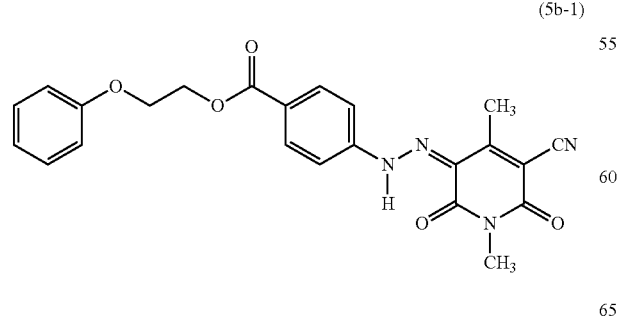

The resulting dye mixture of the invention was formulated using dispersing agent and dried via spray drying and gives yellow brown dyeings and prints, on polyester or polyester blends for example, under the dyeing conditions typical for disperse dyes.

Example 14

71 parts dye of the formula (1-4)

(1-4)

were mixed with 29 parts of a dye powder of the formula (5b-2)

(5b-1)

The resulting dye mixture of the invention was formulated using dispersing agent and dried via spray drying and gives deep brown dyeings or prints, on polyester or polyester blends for example, under the dyeing conditions typical for disperse dyes.

Example 15

29 parts dye of the formula (1-4)

(1-4)

were mixed with 34 parts of a dye of the formula (2-2)

(2-2)

and mixed with 37 parts of a dye powder of the formula (5b-1)

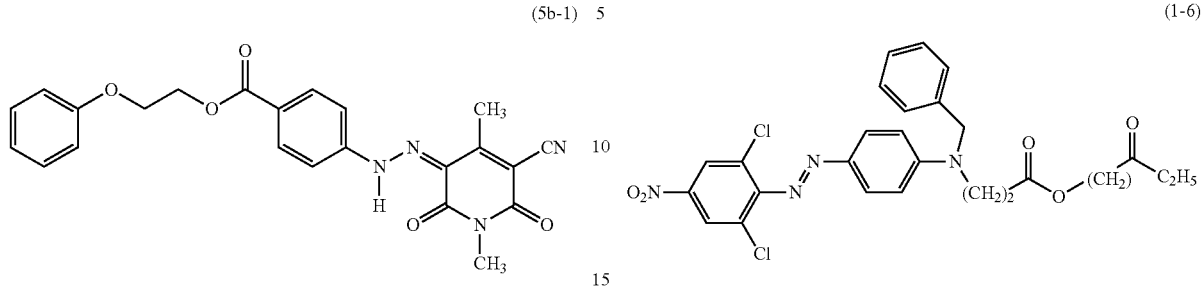

(5b-1)

The resulting dye mixture of the invention was formulated using dispersing agent and dried via spray drying and gives deep brown dyeings or prints, on polyester or polyester blends for example, under the dyeing conditions typical for disperse dyes.

Example 16

21 parts dye of the formula (1-5)

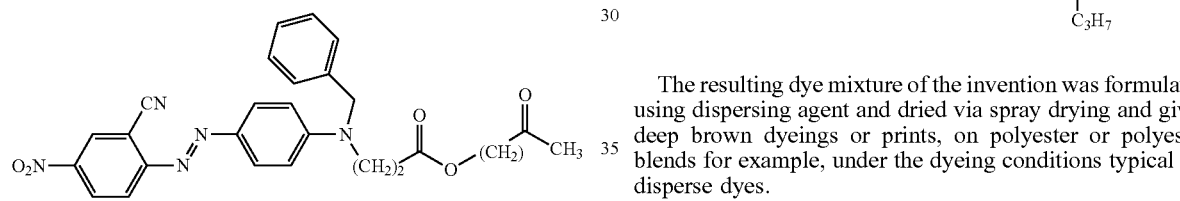

(1-5)

were mixed with 47 parts of a dye powder of the formula (1-6)

(1-6)

and mixed with 32 parts of a dye of the formula (2-6)

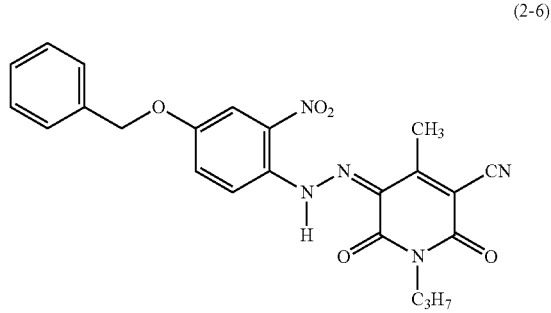

(2-6)

The resulting dye mixture of the invention was formulated using dispersing agent and dried via spray drying and gives deep brown dyeings or prints, on polyester or polyester blends for example, under the dyeing conditions typical for disperse dyes.

All examples of the following tables are prepared as formulations as explained above.

TABLE 1

| Example | Dye of formula (1) | Dye of formula (2) | $1^{st}$ Dye of formula (3) | $2^{nd}$ Dye of formula (3) |
|---|---|---|---|---|
| 17 | $X^1$ = CN, $X^2$ = H<br>$X^3$ = $NO_2$<br>$R^1$ = $CH_3$<br>$R^2$ = $C_2H_5$<br>$Y^1$ = $C_2H_5$<br>$Y^3$ = H<br>n = 2, m = 1 | $X^4$ = $NO_2$<br>$Y^2$ = $CH_2$-(p-Toloudin)<br>$Y^4$ = $CH_3$ | $X^5$ = Cl<br>$X^6$ = $NO_2$<br>$R^2$ = $C_2H_5$<br>$Y^5$ = $OCH_3$<br>$R^3$ = $C_2H_4$—$COOCH_3$<br>$R^4$ = $C_2H_5$ | — |
| 18 | $X^1$ = $NO_2$, $X^2$ = H<br>$X^3$ = $NO_2$<br>$R^1$ = H $R^2$ = $C_2H_5$<br>$Y^1$ = $C_2H_5$<br>$Y^3$ = H<br>n = 2, m = 1 | $X^4$ = $NO_2$<br>$Y^2$ = $CH_2$-(p-Chloro-phenyl)<br>$Y^4$ = $C_2H_5$ | — | — |
| 19 | $X^1$ = CN, $X^2$ = H<br>$X^3$ = $NO_2$<br>$R^1$ = H $R^2$ = $CH_3$<br>$Y^1$ = $C_2H_5$<br>$Y^3$ = H<br>n = 2, m = 1 | $X^4$ = $NO_2$<br>$Y^2$ = $CH_2$-(p-methoxy-phenyl)<br>$Y^4$ = $CH_3$ | $X^5$ = Cl<br>$X^6$ = $NO_2$<br>$R^2$ = $CH_3$<br>$Y^5$ = $OCH_3$<br>$R^3$ = $CH_2$—$COOCH_3$<br>$R^4$ = $CH_2$—$COOCH_3$ | — |
| 20 | $X^1$ = CN, $X^2$ = H<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | $X^5$ = CN<br>$X^6$ = $NO_2$<br>$R^2$ = $CH_3$<br>$Y^5$ = $OCH_3$<br>$R^3$ = $CH_2$—$COOCH_3$<br>$R^4$ = $C_2H_5$ | $X^5$ = CN<br>$X^6$ = $NO_2$<br>$R^2$ = $CH_3$<br>$Y^5$ = H<br>$R^3$ = $CH_2$—$COOCH_3$<br>$R^4$ = $C_2H_5$ |
| 21 | $X^1$ = CN, $X^2$ = H<br>$X^3$ = $NO_2$ | $X^4$ = $NO_2$<br>$Y^2$ = $CH_2$-phenyl | — | — |

TABLE 1-continued

|    |    |    |    |    |
|----|----|----|----|----|
|    | $R^1$ = H<br>$R^2$ = $C_2H_5$<br>$Y^1$ = $CH_2$- phenyl<br>n = 2, m = 1 | $Y^4$ = $C_2H_5$ | | |
| 22 | $X^1$ = CN, $X^2$ = H<br>$X^3$ = $NO_2$<br>$R^1$ = $CH_3$<br>$R^2$ = $CH_3$<br>$Y^1$ = $CH_2$-phenyl<br>$Y^3$ = $CH_3$<br>n = 2, m = 1 | $X^4$ = $NO_2$<br>$Y^2$ = $CH_2$-phenyl<br>$Y^4$ = $CH_3$ | $X^5$ = H<br>$X^6$ = $NO_2$<br>$R^2$ = $CH_3$<br>$Y^5$ = $OCH_3$<br>$R^3$ = $CH_2$—$COOCH_3$<br>$R^4$ = $C_2H_5$ | — |
| 23 | $X^1$ = $NO_2$, $X^2$ = H<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $C_2H_5$ | — | — |
| 24 | $X^1$ = CN, $X^2$ = H<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | — | — |
| 25 | $X^1$ = Br, $X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $C_2H_5$ | — | — |
| 26 | $X^1$ = Cl, $X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | — | — |
| 27 | $X^1$ = Br, $X^2$ = Br<br>$X^3$ = $NO_2$<br>$R^1$ = $CH_3$<br>$R^2$ = $C_2H_5$<br>$Y^1$ = $CH_2$-phenyl<br>$Y^3$ = $CH_3$<br>n = 2, m = 1 | $X^4$ = CN<br>$Y^2$ = $CH_2$-phenyl<br>$Y^4$ = $C_2H_5$ | $X^5$ = Br<br>$X^6$ = $NO_2$<br>$R^2$ = $CH_3$<br>$Y^5$ = $OCH_3$<br>$R^3$ = $CH_2$—$COOCH_3$<br>$R^4$ = $CH_2$-phenyl | — |
| 28 | $X^1$ = Cl, $X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | $X^5$ = CN<br>$X^6$ = $NO_2$<br>$R^2$ = $CH_3$<br>$Y^5$ = H<br>$R^3$ = $C_2H_4$—$COOCH_2$—$COCH_3$<br>$R^4$ = $C_2H_5$ | — |
| 29 | $X^1$ = Cl, $X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $C_3H_7$ | — | — |
| 30 | $X^1$ = Cl, $X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | $X^5$ = Cl<br>$X^6$ = $NO_2$<br>$R^2$ = $CH_3$<br>$Y^5$ = $OCH_3$<br>$R^3$ = $CH_2$—$COOCH_3$<br>$R^4$ = $C_2H_5$ | — |
| 31 | $X^1$ = Cl, $X^2$ = Br<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | $X^5$ = Br<br>$X^6$ = $NO_2$<br>$R^2$ = $CH_3$<br>$Y^5$ = $OCH_3$<br>$R^3$ = $CH_2$—$COOCH_3$<br>$R^4$ = $CH_2$-phenyl | — |
| 32 | $X^1$ = Br, $X^2$ = Br<br>$X^3$ = $NO_2$<br>$R^1$ = H<br>$R^2$ = $CH_3$<br>$Y^1$ = $CH_2$-phenyl<br>$Y^3$ = H | $X^4$ = $NO_2$<br>$Y^2$ = $CH_2$-phenyl<br>$Y^4$ = $C_2H_5$ | $X^5$ = Cl<br>$X^6$ = $NO_2$<br>$R^2$ = $CH_3$<br>$Y^5$ = $OCH_3$<br>$R^3$ = $CH_2$—$COOCH_3$<br>$R^4$ = $CH_3$ | — |

TABLE 1-continued

| | | | | |
|---|---|---|---|---|
| 33 | $X^1$ = Cl, $X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | $X^5$ = CN<br>$X^6$ = $NO_2$<br>$R^2$ = $CH_3$<br>$Y^5$ = $OCH_3$<br>$R^3$ = $CH_2$—$COOCH_3$<br>$R^4$ = $C_2H_5$ | — |
| 34 | $X^1$ = Cl, $X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | — | — |
| 35 | $X^1$ = Cl, $X^2$ = Cl<br>$X^3$ = $NO_2$<br>$R^1$ = H<br>$R^2$ = $C_2H_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | $X^5$ = Br<br>$X^6$ = $NO_2$<br>$R^2$ = $CH_3$<br>$Y^5$ = $OCH_3$<br>$R^3$ = $CH_2$—$COOCH_3$<br>$R^4$ = $C_2H_5$ | — |
| 36 | $X^1$ = Cl, $X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | $X^5$ = Br<br>$X^6$ = $NO_2$<br>$R^2$ = $CH_3$<br>$Y^5$ = $OCH_3$<br>$R^3$ = $CH_2$—$COOCH_3$<br>$R^4$ = $C_2H_5$ | — |
| 37 | $X^1$ = CN, $X^2$ = H<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | $X^5$ = Cl<br>$X^6$ = $NO_2$<br>$R^2$ = $CH_3$<br>$Y^5$ = $OCH_3$<br>$R^3$ = CH2—$COOCH_3$<br>$R^4$ = CH2—$COOCH_3$ | $X^5$ = CN<br>$X^6$ = $NO_2$<br>$R^2$ = $CH_3$<br>$Y^5$ = H<br>$R^3$ = $CH_2$—$COOCH_3$<br>$R^4$ = $C_2H_5$ |
| 38 | $X^1$ = Cl, $X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2, m = 1 | $X^4$ = $NO_2$<br>$Y^2$ = $CH_2$-phenyl<br>$Y^4$ = $CH_3$ | $X^5$ = Cl<br>$X^6$ = $NO_2$<br>$R^2$ = $CH_3$<br>$Y^5$ = $OCH_3$<br>$R^3$ = $CH_2$—$COOCH_3$<br>$R^4$ = CH2—$COOCH_3$ | $X^5$ = CN<br>$X^6$ = $NO_2$<br>$R^2$ = $CH_3$<br>$Y^5$ = H<br>$R^3$ = $CH_2$—$COOCH_3$<br>$R^4$ = $C_2H_5$ |
| 39 | $X^1$ = Cl<br>$X^2$ = Br<br>$X^3$ = $NO_2$<br>$R^1$ = H<br>$R^2$ = $CH_3$<br>$Y^1$ = $CH_2$-phenyl<br>$Y^3$ = H<br>n = 2<br>m = 1 | — | $X^5$ = CN<br>$X^6$ = $NO_2$<br>$R^2$ = $CH_3$<br>$Y^5$ = H<br>$R^3$ = $C_2H_4$—$COOCH_2$—$COCH_3$<br>$R^4$ = $C_2H_5$ | — |
| 40 | $X^1$ = Cl<br>$X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2<br>m = 1 | — | $X^5$ = Cl<br>$X^6$ = $NO_2$<br>$R^2$ = $CH_3$<br>$Y^5$ = $OCH_3$<br>$R^3$ = $CH_2$—$COOCH_3$<br>$R^4$ = $CH_2$—$COOCH_3$ | $X^5$ = CN<br>$X^6$ = $NO_2$<br>$R^2$ = $CH_3$<br>$Y^5$ = H<br>$R^3$ = $CH_2$—$COOCH_3$<br>$R^4$ = C2H5 |
| 41 | $X^1$ = Cl<br>$X^2$ = Br<br>$X^3$ = $NO_2$<br>$R^1$ = H<br>$R^2$ = $CH_3$<br>$Y^1$ = $CH_2$-phenyl<br>$Y^3$ = H<br>n = 2<br>m = 1 | — | $X^5$ = CN<br>$X^6$ = $NO_2$<br>$R^2$ = $CH_3$<br>$Y^5$ = H<br>$R^3$ = $C_2H_4$—$COOCH_2$—$COCH_3$<br>$R^4$ = $C_2H_5$ | — |
| 42 | $X^1$ = Cl<br>$X^2$ = Br<br>$X^3$ = $NO_2$<br>$R^1$ = H<br>$R^2$ = $CH_3$<br>$Y^1$ = $CH_2$-phenyl<br>$Y^3$ = H<br>n = 2<br>m = 1 | — | $X^5$ = Cl<br>$X^6$ = $NO_2$<br>$R^2$ = $CH_3$<br>$Y^5$ = $OCH_3$<br>$R^3$ = $CH_2$—$COOCH_3$<br>$R^4$ = $CH_2$—$COOCH_3$ | $X^5$ = CN<br>$X^6$ = $NO_2$<br>$R^2$ = $CH_3$<br>$Y^5$ = H<br>$R^3$ = $CH_2$—$COOCH_3$<br>$R^4$ = $C_2H_5$ |

TABLE 1-continued

| | | | | |
|---|---|---|---|---|
| 43 | $X^1$ = Cl<br>$X^2$ = Br<br>$X^3$ = $NO_2$<br>$R^1$ = H<br>$R^2$ = $CH_3$<br>$Y^1$ = $CH_2$-phenyl<br>$Y^3$ = H<br>n = 2<br>m = 1 | — | $X^5$ = Cl<br>$X^6$ = $NO_2$<br>$R^2$ = $CH_3$<br>$Y^5$ = $OCH_3$<br>$R^3$ = $CH_2$—$COOCH_3$<br>$R^4$ = $C_2H_5$ | — |
| 44 | $X^1$ = Cl<br>$X^2$ = Br<br>$X^3$ = $NO_2$<br>$R^1$ = H<br>$R^2$ = $CH_3$<br>$Y^1$ = $CH_2$-phenyl<br>$Y^3$ = H<br>n = 2<br>m = 1 | — | — | — |
| 45 | $X^1$ = $NO_2$<br>$X^2$ = Br<br>$X^3$ = $NO_2$<br>$R^1$ = H<br>$R^2$ = $CH_3$<br>$Y^1$ = $CH_2$-phenyl<br>$Y^3$ = H<br>n = 2<br>m = 1 | — | — | — |
| 46 | $X^1$ = $NO_2$<br>$X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2<br>m = 1 | — | $X^5$ = CN<br>$X^6$ = $NO_2$<br>$R^2$ = $CH_3$<br>$Y^5$ = $OCH_3$<br>$R^3$ = $CH_2$—$COOCH_3$<br>$R^4$ = $C_2H_5$ | — |

| Example | Dye of formula (4) | Dye of formula (5) | Ratio (1):(2):(3):(3):(4)(5) | Shade on Polyester |
|---|---|---|---|---|
| 17 | — | — | 16:7:77:—:—:— | Navy |
| 18 | $X^7$ = $NO_2$<br>$R^2$ = $C_2H_5$<br>$Y^5$ = $OCH_3$<br>$R^5$ = C2H4—$COOCH_3$<br>$R^6$ = C2H4—$COOCH_3$ | — | 10:10:—:—:80:— | Navy |
| 19 | $X^7$ = $NO_2$<br>$R^2$ = $C_2H_5$<br>$Y^5$ = $OCH_3$<br>$R^5$ = $CH_2$—$COOCH_3$<br>$R^6$ = $CH_2$—$COOCH_3$ | — | 15:8:45:—:32:— | Navy |
| 20 | — | (5a)<br>$X^8$ = H<br>$R^2$ = $CH_3$<br>$Y^6$ = H | 10:8:40:39:—:3 | Navy |
| 21 | $X^7$ = $NO_2$<br>$R^2$ = $CH_3$<br>$Y^5$ = $OCH_3$<br>$R^5$ = $CH_2$—$COOCH_3$<br>$R^6$ = $CH_2$—$COOCH_3$ | (5b)<br>$X^8$ = H<br>$R^2$ = $C_2H_5$<br>$Y^6$ = H | 10:12:—:—:72:6 | Navy |
| 22 | $X^7$ = $NO_2$<br>$R^2$ = $CH_3$<br>$Y^5$ = $OCH_3$<br>$R^5$ = $CH_2$—$COOCH_3$<br>$R^6$ = $C_2H_5$ | (5a)<br>$X^8$ = H<br>$R^2$ = $C_2H_5$<br>$Y^6$ = H | 10:10:51:—:25:4 | Navy |
| 23 | — | — | 42:58:—:—:—:— | Brown |
| 24 | — | (5b)<br>$X^8$ = H<br>$R^2$ = $CH_3$<br>$Y^6$ = H | 35:40:—:—:—:25 | Brown |
| 25 | — | — | 65:35:—:—:—:— | Brown |
| 26 | — | (5a)<br>$X^8$ = H<br>$R^2$ = $CH_3$<br>$Y^6$ = H | 65:25:—:—:—:10 | Brown |
| 27 | — | — | 32:8:60:—:—:— | Black |
| 28 | $X^7$ = $NO_2$<br>$R^2$ = $CH_3$<br>$Y^5$ = $OCH_3$ | — | 32:6:42:—:20:— | Black |

TABLE 1-continued

| | | | | |
|---|---|---|---|---|
| | $R^5 = CH_2—COOCH_3$ $R^6 = C_2H_5$ | | | |
| 29 | $X^7 = NO_2$ $R^2 = CH_3$ $Y^5 = OCH_3$ $R^5 = CH_2—COOCH_3$ $R^6 = CH_2—COOCH_3$ | — | 40:5:—:—:55:— | Black |
| 30 | | (5a) $X^8 = H$ $R^2 = C_3H_7$ $Y^6 = H$ | 30:9:55:—:—:6 | Black |
| 31 | $X^7 = NO_2$ $R^2 = CH_3$ $Y^5 = OCH_3$ $R^5 = CH_2—COOCH_3$ $R^6 = CH_2$-phenyl | (5a) $X^4 = H$ $R^3 = CH_3$ $Y^6 = H$ | 32:6:32:—:23:7 | Black |
| 32 | — | — | 18:5:77:—:—:— | Navy |
| 33 | $X^7 = NO_2$ $R^2 = CH_3$ $Y^5 = OCH_3$ $R^5 = CH_2—COOCH_3$ $R^6 = C_2H_5$ | — | 15:6:60:—:19:— | Navy |
| 34 | $X^7 = NO_2$ $R^2 = CH_3$ $Y^5 = OCH_3$ $R^5 = CH_2—COOCH_3$ $R^6 = CH_2$-phenyl | — | 13:5:—:—:82:— | Navy |
| 35 | — | (5a) $X^8 = H$ $R^2 = CH_3$ $Y^6 = H$ | 11:6:75:—:—:8 | Navy |
| 36 | $X^7 = NO_2$ $R^2 = CH_3$ $Y^5 = OCH_3$ $R^5 = CH_2—COOCH_3$ $R^6 = C_2H_5$ | (5a) $X^4 = H$ $R^3 = C_2H_5$ $Y^6 = H$ | 11:7:65:—:12:5 | Navy |
| 37 | — | (5b) $X^8 = H$ $R^2 = CH_3$ $Y^6 = H$ | 18:17:32:25:—:8 | Black |
| 38 | — | (5b) $X^8 = H$ $R^2 = CH_3$ $Y^6 = H$ | 25:10:29:28:—:8 | Black |
| 39 | $X^7 = NO_2$ $R^2 = CH_3$ $Y^5 = OCH_3$ $R^5 = CH_2—COOCH_3$ $R^6 = C_2H_5$ | — | 38:—:42:—:20:— | Black |
| 40 | — | | 43:—:29:28:—:— | Black |
| 41 | $X^7 = NO_2$ $R^2 = CH_3$ $Y^5 = OCH_3$ $R^5 = CH_2—COOCH_3$ $R^6 = C2H_5$ | (5b) $X^8 = H$ $R^2 = CH_3$ $Y^6 = H$ | 32:—:42:—:20:6 | Black |
| 42 | — | (5a) $X^8 = H$ $R^2 = CH_3$ $Y^6 = H$ | 35:—:29:28:—:8 | Black |
| 43 | | (5a) $X^8 = H$ $R^2 = C_3H_7$ $Y^6 = H$ | 39:—:55:—:—:6 | Black |
| 44 | $X^7 = NO_2$ $R^2 = CH_3$ $Y^5 = OCH_3$ $R^5 = CH_2—COOCH_3$ $R^6 = CH_2$-phenyl | (5b) $X^8 = H$ $R^2 = CH_3$ $Y^6 = H$ | 13:—:—:—:82:5 | Navy |
| 45 | $X^7 = NO_2$ $R^2 = CH_3$ $Y^5 = OCH_3$ $R^5 = CH_2—COOCH_3$ $R^6 = CH_2—COOCH_3$ | (5b) $X^8 = H$ $R^2 = CH_3$ $Y^6 = H$ | 40:—:—:—;55:5 | Black |
| 46 | — | (5a) $X^8 = H$ $R^2 = CH_3$ $Y^6 = H$ | 48:—:42:—:—:10 | Black |

TABLE 2

| Example | 1st Dye of formula (1) | 2nd Dye of formula (1) | Dye of formula (2) | Dye of formula (5) | Ratio (1):(1):(2):(5) | Shade on Polyester |
|---|---|---|---|---|---|---|
| 47 | $X^1 = NO_2$<br>$X^2 = H$<br>$X^3 = NO_2$<br>$R^1 = H$ $R^2 = C_2H_5$<br>$Y^1 = C_2H_5$<br>$Y^3 = H$<br>$n = 2$<br>$m = 1$ | — | — | (5b)<br>$X^8 = H$<br>$R^2 = C_2H_5$<br>$Y^6 = H$ | 70:—:—:30 | Brown |
| 48 | $X^1 = NO_2$<br>$X^2 = H$<br>$X^3 = NO_2$<br>$R^1 = H$ $R^2 = C_2H_5$<br>$Y^1 = C_2H_5$<br>$Y^3 = H$<br>$n = 2$<br>$m = 1$ | — | $X^4 = NO_2$<br>$Y^2 = CH_2$-(p-Chloro-phenyl)<br>$Y^4 = C_2H_5$ | (5a)<br>$X^8 = H$<br>$R^2 = CH_3$<br>$Y^6 = H$ | 30:—:33:37 | Brown |
| 49 | $X^1 = Cl$<br>$X^2 = Br$<br>$X^3 = NO_2$<br>$R^1 = H$ $R^2 = CH_3$<br>$Y^1 = CH_3$<br>$Y^3 = H$<br>$n = 2$<br>$m = 1$ | — | $X^4 = NO_2$<br>$Y^2 = CH_2$-(p-methoxy-phenyl)<br>$Y^4 = CH_3$ | — | 77:—:23:—:— | Yellowbrown |
| 50 | $X^1 = Br$<br>$X^2 = Br$<br>$X^3 = NO_2$<br>$R^1 = H$<br>$R^2 = CH_3$<br>$Y^1 = CH_2$-phenyl<br>$Y^3 = H$<br>$n = 2$<br>$m = 1$ | — | — | (5a)<br>$X^8 = H$<br>$R^2 = C_2H_5$<br>$Y^6 = H$ | 87:—:—:13 | Yellowbrown |
| 51 | $X^1 = Br$<br>$X^2 = Cl$<br>$X^3 = NO_2$<br>$R^1 = H$<br>$R^2 = C_2H_5$<br>$Y^1 = CH_2$-phenyl<br>$Y^3 = H$<br>$n = 2$<br>$m = 1$ | — | $X^4 = NO_2$<br>$Y^2 = CH_2$-phenyl<br>$Y^4 = C_2H_5$ | (5b)<br>$X^8 = H$<br>$R^2 = CH_3$<br>$Y^6 = H$ | 72:—:22:6 | Yellowbrown |
| 52 | $X^1 = CN$<br>$X^2 = H$<br>$X^3 = NO_2$<br>$R^1 = H$<br>$R^2 = CH_3$<br>$Y^1 = CH_2$-phenyl<br>$Y^3 = H$<br>$n = 2$<br>$m = 1$ | $X^1 = Cl$<br>$X^2 = Cl$<br>$X^3 = NO_2$<br>$R^1 = H$<br>$R^2 = CH_3$<br>$Y^1 = CH_2$-phenyl<br>$Y^3 = H$<br>$n = 2$<br>$m = 1$ | $X^4 = NO_2$<br>$Y^2 = CH_2$-phenyl<br>$Y^4 = C_2H_5$ | (5a)<br>$X^8 = H$<br>$R^2 = CH_3$<br>$Y^6 = H$ | 18:26:21:35 | Brown |
| 53 | $X^1 = NO_2$<br>$X^2 = H$<br>$X^3 = NO_2$<br>$R^1 = H$<br>$R^2 = CH_3$<br>$Y^1 = CH_2$-phenyl<br>$Y^3 = H$<br>$n = 2$<br>$m = 1$ | $X^1 = Cl$<br>$X^2 = Br$<br>$X^3 = NO_2$<br>$R^1 = H$<br>$R^2 = C_2H_5$<br>$Y^1 = CH_2$-phenyl<br>$Y^3 = H$<br>$n = 2$<br>$m = 1$ | $X^4 = NO_2$<br>$Y^2 = CH_2$-phenyl<br>$Y^4 = CH_3$ | (5b)<br>$X^8 = H$<br>$R^2 = C_2H_5$<br>$Y^6 = H$ | 24:24:18:34 | Brown |
| 54 | $X^1 = CN$<br>$X^2 = H$<br>$X^3 = NO_2$<br>$R^1 = H$<br>$R^2 = C_2H_5$<br>$Y^1 = CH_2$-phenyl<br>$Y^3 = H$<br>$n = 2$<br>$m = 1$ | $X^1 = Br$<br>$X^2 = Br$<br>$X^3 = NO_2$<br>$R^1 = H$<br>$R^2 = CH_3$<br>$Y^1 = CH_2$-phenyl<br>$Y^3 = H$<br>$n = 2$<br>$m = 1$ | — | (5b)<br>$X^8 = H$<br>$R^2 = CH_3$<br>$Y^6 = H$ | 32:44:—:24 | Brown |
| 55 | $X^1 = NO_2$<br>$X^2 = H$<br>$X^3 = NO_2$<br>$R^1 = H$<br>$R^2 = CH_3$<br>$Y^1 = CH_2$-phenyl<br>$Y^3 = H$ | $X^1 = Br$<br>$X^2 = Cl$<br>$X^3 = NO_2$<br>$R^1 = H$<br>$R^2 = C_2H_5$<br>$Y^1 = CH_2$-phenyl<br>$Y^3 = H$ | | (5a)<br>$X^8 = H$<br>$R^2 = C_3H_7$<br>$Y^6 = H$ | 30:42:—:28 | Brown |

TABLE 2-continued

| Example | 1st Dye of formula (1) | 2nd Dye of formula (1) | Dye of formula (2) | Dye of formula (5) | Ratio (1):(1):(2):(5) | Shade on Polyester |
|---|---|---|---|---|---|---|
| 56 | n = 2<br>m = 1<br>$X^1$ = $NO_2$<br>$X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2<br>m = 1 | n = 2<br>m = 1<br>$X^1$ = Cl<br>$X^2$ = Cl<br>$X^3$ = $NO_2$<br>$R^1$ = H<br>$R^2$ = $CH_3$<br>$Y^1$ = $CH_2$-phenyl<br>$Y^3$ = H<br>n = 2<br>m = 1 | — | (5b)<br>$X^8$ = H<br>$R^2$ = $CH_3$<br>$Y^6$ = H | 20:48:—:32 | Brown |

The invention claimed is:

1. A dye mixture comprising comprising at least one dye of formula (1)

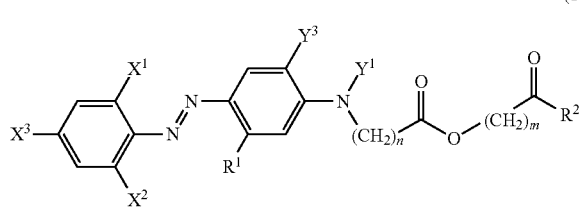
(1)

and at least one dye of formula (2)

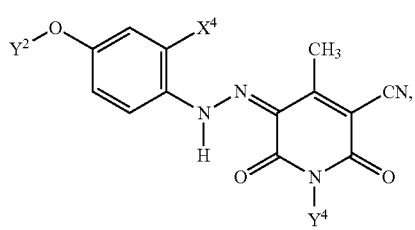
(2)

and optionally one or more dyes selected from the group consisting of dyes of formulae (3), (4), (5a) and (5b)

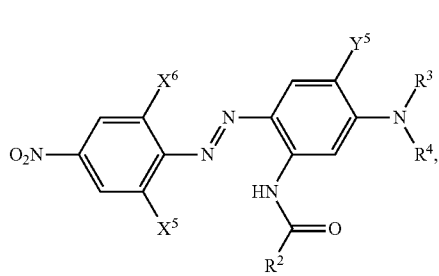
(3)

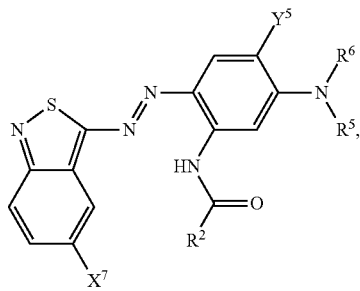
(4)

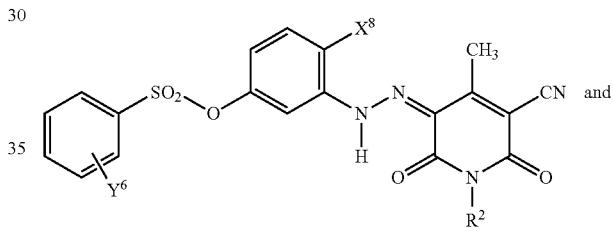
(5a)

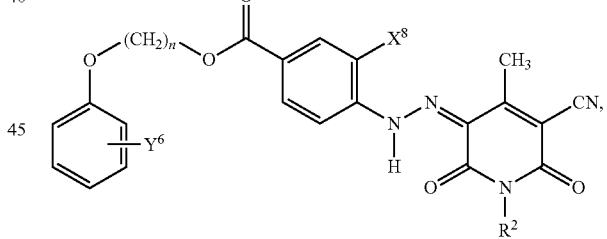
(5b)

wherein independent from each other
$R^1$ is hydrogen, ($C_1$-$C_4$)-alkyl or halogen,
$R^2$ is hydrogen or ($C_1$-$C_4$)-alkyl,
$R^3$ to $R^6$ is ($C_1$-$C_4$)-alkyl, $(CH_2)_n$—O—($C_1$-$C_4$)-alkyl, $(CH_2)_n$—O—CO—($C_1$-$C_4$)-alkyl, $(CH_2)_n$—COO—($C_1$-$C_4$)-alkyl, $(CH_2)_n$-phenyl or $(CH_2)_n$—COO—$(CH_2)_m$—CO—($C_1$-$C_4$)-alkyl,
$X^1$ to $X^8$ is hydrogen, halogen, nitro, cyano, SCN, carboxy or CO—$NR^2R^3$,
$Y^1$ is hydrogen, ($C_1$-$C_4$)-alkyl, substituted ($C_1$-$C_4$)-alkyl, ($C_2$-$C_4$)-alkenyl or $(CH_2)_m$-phenyl,
$Y^2$ is phenyl or $(CH_2)_m$-phenyl, both substituted by $Y^6$,
$Y^3$ is hydrogen or ($C_1$-$C_4$)-alkyl,
$Y^4$ is ($C_1$-$C_8$-alkyl or $(CH_2)_m$-phenyl,
$Y^5$ is hydrogen, ($C_1$-$C_4$)-alkyl or ($C_1$-$C_4$)-alkoxy,
$Y^6$ is hydrogen, nitro, cyano, carboxy, ($C_1$-$C_4$)-alkyl or ($C_1$-$C_4$)-alkoxy, and n and m is 1, 2, 3 or 4.

2. The dye mixture according to claim 1, wherein independent from each other
$R^1$ is hydrogen or $(C_1-C_2)$-alkyl,
$R^2$ is $(C_1-C_2)$-alkyl,
$R^3$ to $R^6$ is $(C_1-C_2)$-alkyl, $(CH_2)_n$-phenyl, $(CH_2)_n$—COO—$(C_1-C_2)$-alkyl or $(CH_2)_n$—COO$(CH_2)_m$—CO—$(C_1-C_2)$-alkyl,
$X^1$ and $X^2$ are hydrogen, bromo, chloro, nitro or cyano,
$X^3$ and $X^7$ are nitro or cyano,
$X^4$ is hydrogen, nitro or cyano,
$X^5$ and $X^6$ are hydrogen, bromo, chloro, nitro or cyano,
$X^8$ is hydrogen, nitro or cyano,
$Y^1$ is $(C_1-C_4)$-alkyl or $(CH_2)_m$-phenyl,
$Y^2$ is phenyl or $(CH_2)_m$-phenyl,
$Y^3$ is hydrogen, or $(C_1-C_2)$-alkyl
$Y^4$ is $(C_1-C_8)$-alkyl or $(CH_2)_m$-phenyl,
$Y^5$ is hydrogen, $(C_1-C_2)$-alkyl or $(C_1-C_2)$-alkoxy, and
n and m is 1 or 2.

3. The dye mixture according to claim 1, wherein independent from each other
$R^1$ is hydrogen or methyl,
$R^2$ is methyl or ethyl,
$R^3$ to $R^6$ is $(C_1-C_2)$-alkyl, $(CH_2)_n$-phenyl, $(CH_2)_n$—COO—$(C_1-C_2)$-alkyl or $(CH_2)_n$—COO$(CH_2)_m$—CO—$(C_1-C_2)$-alkyl,
$X^1$ and $X^2$ are hydrogen, bromo, chloro, nitro or cyano,
$X^3$, $X^4$ and $X^7$ are nitro,
$X^5$ and $X^6$ are hydrogen, bromo, chloro, nitro or cyano,
$X^8$ is hydrogen,
$Y^1$ and $Y^2$ are $(CH_2)_m$-phenyl,
$Y^3$ is hydrogen or methyl,
$Y^4$ is $(C_1-C_8)$-alkyl or $(CH_2)_m$-phenyl,
$Y^5$ is hydrogen, O-methyl or O-ethyl, and
n and m is 1 or 2.

4. The dye mixture according to claim 1, wherein independent from each other
$R^1$ is hydrogen,
$R^2$ is methyl or ethyl,
$R^3$ to $R^6$ is $(C_1-C_2)$-alkyl, $(CH_2)_n$-phenyl, $(CH_2)_n$—COO—$(C_1-C_2)$-alkyl or $(CH_2)_n$—COO$(CH_2)_m$—CO—$(C_1-C_2)$-alkyl,
$X^1$ and $X^2$ are hydrogen, bromo, chloro, nitro or cyano,
$X^3$, $X^4$ and $X^7$ are nitro,
$X^5$ and $X^6$ are hydrogen, bromo, chloro, nitro or cyano,
$X^8$ is hydrogen,
$Y^1$ and $Y^2$ are $(CH_2)_m$-phenyl,
$Y^3$ is hydrogen,
$Y^4$ is $(C_1-C_4)$-alkyl,
$Y^5$ is hydrogen or O-methyl, and
n and m is 1 or 2.

5. The dye mixture according to claim 1, comprising at least one dye selected from the group consisting of dyes of formulae (3), (4), (5a) and (5b).

6. The dye mixture according to claim 1, comprising at least two dyes of formula (3).

7. The dye mixture according to claim 1, comprising at least two dyes of formula (3) and at least one dye selected from the group consisting of dyes of formulae (4), (5a) and (5b).

8. A dye mixture comprising
at least one dye of formula (3) and at least one dye of formula (4)

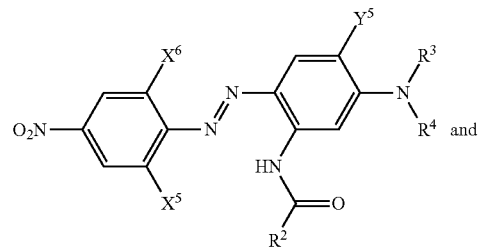

(3)

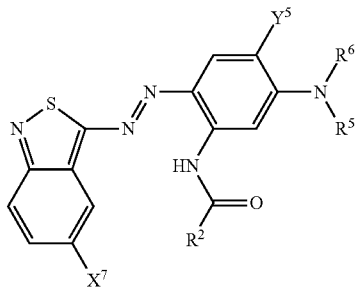

(4)

and at least one dye of formula (1)

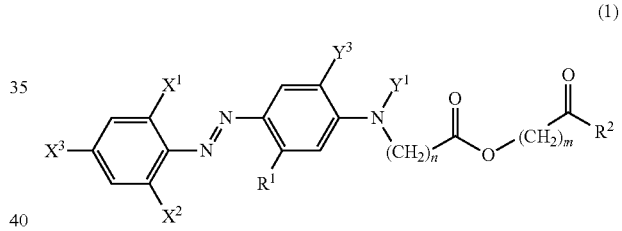

(1)

and optionally one or more dyes selected from the group consisting of dyes of formulae (2), (5a) and (5b)

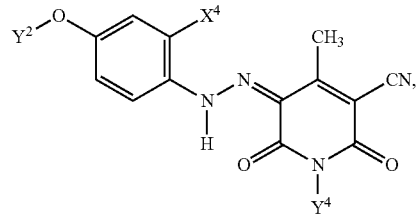

(2)

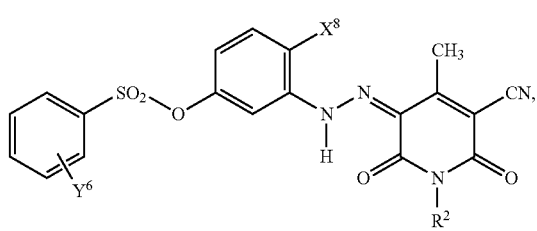

(5a)

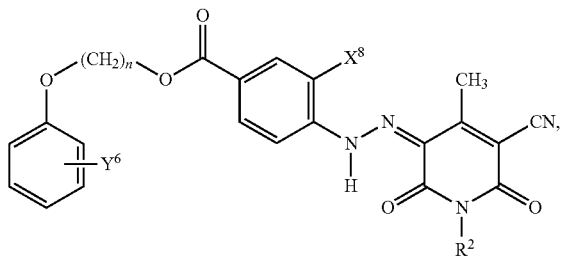

wherein independent from each other
$R^1$ is hydrogen, $(C_1-C_4)$-alkyl or halogen,
$R^2$ is hydrogen or $(C_1-C_4)$-alkyl,
$R^3$ and $R^4$ are identical or different and are $(C_1-C_4)$-alkyl, $(CH_2)_n$—O—$(C_1-C_4)$-alkyl, $(CH_2)_n$—O—CO—$(C_1-C_4)$-alkyl, $(CH_2)_n$—COO—$(C_1-C_4)$-alkyl, $(CH_2)_n$-phenyl or $(CH_2)_n$—COO$(CH_2)_m$—CO—$(C_1-C_4)$-alkyl,
$R^5$ and $R^6$ are identical or different and are $(C_1-C_4)$-alkyl, $(CH_2)_n$—O—CO—$(C_1-C_4)$-alkyl, $(CH_2)_n$—COO—$(C_1-C_4)$-alkyl, $(CH_2)_n$-phenyl or $(CH_2)_n$—COO$(CH_2)_m$—CO—$(C_1-C_4)$-alkyl,
n1 is 1, 3 or 4,
$X^1$ to $X^8$ is hydrogen, halogen, nitro, cyano, SCN, carboxy or CO—$NR^2R^3$,
$Y^1$ is hydrogen, $(C_1-C_4)$-alkyl, substituted $(C_1-C_4)$-alkyl, $(C_2-C_4)$-alkenyl or $(CH_2)_m$-phenyl,
$Y^2$ is phenyl or $(CH_2)_m$-phenyl, both substituted by $Y^6$,
$Y^3$ is hydrogen or $(C_1-C_4)$-alkyl,
$Y^4$ is $(C_1-C_8$-alkyl or $(CH_2)_m$-phenyl,
$Y^5$ is hydrogen, $(C_1-C_4)$-alkyl or $(C_1-C_4)$-alkoxy,
$Y^6$ is hydrogen, nitro, cyano, carboxy, $(C_1-C_4)$-alkyl or $(C_1-C_4)$-alkoxy, and
n and m is 1, 2, 3 or 4.

9. The dye mixture according to claim 8, wherein independent from each other
$R^1$ is hydrogen or $(C_1-C_2)$-alkyl,
$R^2$ is $(C_1-C_2)$-alkyl,
$R^3$ to $R^6$ is $(C_1-C_2)$-alkyl, $(CH_2)_n$-phenyl, $(CH_2)_n$—COO—$(C_1-C_2)$-alkyl or $(CH_2)_n$—COO$(CH_2)_m$—CO—$(C_1-C_2)$-alkyl,
$X^1$ and $X^2$ are hydrogen, bromo, chloro, nitro or cyano,
$X^3$ and $X^7$ are nitro or cyano,
$X^4$ is hydrogen, nitro or cyano,
$X^5$ and $X^6$ are hydrogen, bromo, chloro, nitro or cyano,
$X^8$ is hydrogen, nitro or cyano,
$Y^1$ is $(C_1-C_4)$-alkyl or $(CH_2)_m$-phenyl,
$Y^2$ is phenyl or $(CH_2)_m$-phenyl,
$Y^3$ is hydrogen, or $(C_1-C_2)$-alkyl,
$Y^4$ is $(C_1-C_8$-alkyl or $(CH_2)_m$-phenyl,
$Y^5$ is hydrogen, $(C_1-C_2)$-alkyl or $(C_1-C_2)$-alkoxy, and
n and m is 1 or 2.

10. The dye mixture according to claim 8, wherein independent from each other
$R^1$ is hydrogen or methyl,
$R^2$ is methyl or ethyl,
$R^3$ to $R^6$ is $(C_1-C_2)$-alkyl, $(CH_2)_n$-phenyl, $(CH_2)_n$—COO—$(C_1-C_2)$-alkyl or $(CH_2)_n$—COO$(CH_2)_m$—CO—$(C_1-C_2)$-alkyl,
$X^1$ and $X^2$ are hydrogen, bromo, chloro, nitro or cyano,
$X^3$, $X^4$ and $X^7$ are nitro,
$X^5$ and $X^6$ are hydrogen, bromo, chloro, nitro or cyano,
$X^8$ is hydrogen,
$Y^1$ and $Y^2$ are $(CH_2)_m$-phenyl,
$Y^3$ is hydrogen or methyl,
$Y^4$ is $(C_1-C_8)$-alkyl or $(CH_2)_m$-phenyl,
$Y^5$ is hydrogen, O-methyl or O-ethyl, and
n and m is 1 or 2.

11. The dye mixture according to claim 8, wherein independent from each other
$R^1$ is hydrogen,
$R^2$ is methyl or ethyl,
$R^3$ to $R^6$ is $(C_1-C_2)$-alkyl, $(CH_2)_n$-phenyl, $(CH_2)_n$—COO—$(C_1-C_2)$-alkyl or $(CH_2)_n$—COO$(CH_2)_m$—CO—$(C_1-C_2)$-alkyl,
$X^1$ and $X^2$ are hydrogen, bromo, chloro, nitro or cyano,
$X^3$, $X^4$ and $X^7$ are nitro,
$X^5$ and $X^6$ are hydrogen, bromo, chloro, nitro or cyano,
$X^8$ is hydrogen,
$Y^1$ and $Y^2$ are $(CH_2)_m$-phenyl,
$Y^3$ is hydrogen,
$Y^4$ is $(C_1-C_4)$-alkyl,
$Y^5$ is hydrogen or O-methyl, and
n and m is 1 or 2.

12. The dye mixture according to claim 8, comprising at least two dyes of formula (3).

13. The dye mixture according to claim 8, comprising at least one dye of formula (2).

14. The dye mixture according to claim 8, comprising at least one dye of formulae (4) and (5a).

15. A dye mixture comprising
at least one dye of formula (1)

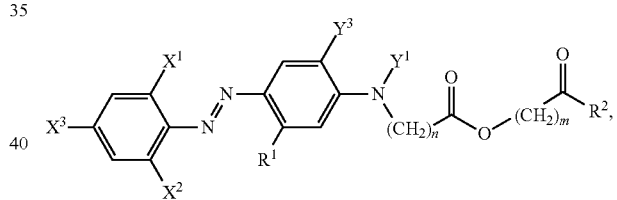

and one or more dyes selected from the group consisting of dyes of formulae (2), (5a) and (5b)

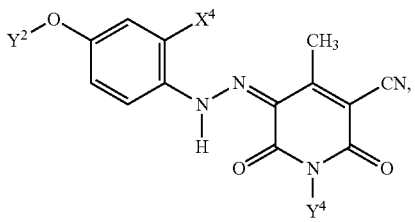

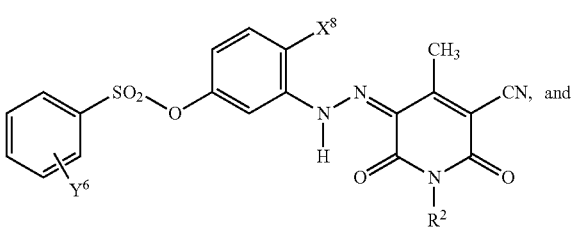

-continued (5b)

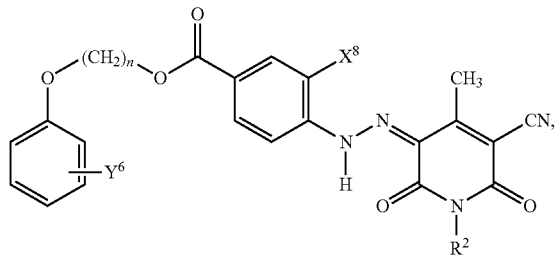

wherein independent from each other
$R^1$ is hydrogen, $(C_1-C_4)$-alkyl or halogen,
$R^2$ is hydrogen or $(C_1-C_4)$-alkyl,
$X^1$ to $X^4$ and $X^8$ are independently a hydrogen, halogen, nitro, cyano, SCN, carboxy or CO—$NR^2R^2$,
$Y^1$ is hydrogen, $(C_1-C_4)$-alkyl, substituted $(C_1-C_4)$-alkyl, $(C_2-C_4)$-alkenyl or $(CH_2)_m$-phenyl,
$Y^2$ is phenyl or $(CH_2)_m$-phenyl, both substituted by $Y^6$,
$Y^3$ is hydrogen or $(C_1-C_4)$-alkyl,
$Y^4$ is $(C_1-C_8)$-alkyl or $(CH_2)_m$-phenyl,
$Y^6$ is hydrogen, nitro, cyano, carboxy, $(C_1-C_4)$-alkyl or $(C_1-C_4)$-alkoxy, and
n and m is 1, 2, 3 or 4.

16. The dye mixture according to claim 15, wherein independent from each other
$R^1$ is hydrogen or $(C_1-C_2)$-alkyl,
$R^2$ is $(C_1-C_2)$-alkyl,
$X^1$ and $X^2$ are hydrogen, bromo, chloro, nitro or cyano,
$X^3$ is nitro or cyano,
$X^4$ and $X^8$ are hydrogen, nitro or cyano,
$Y^1$ is $(C_1-C_4)$-alkyl or $(CH_2)_m$-phenyl,
$Y^2$ is phenyl or $(CH_2)_m$-phenyl,
$Y^3$ is hydrogen, or $(C_1-C_2)$-alkyl,
$Y^4$ is $(C_1-C_3)$-alkyl, and
n and m is 1 or 2.

17. The dye mixture according to claim 15, wherein independent from each other
$R^1$ is hydrogen or methyl,
$R^2$ is methyl or ethyl,
$X^1$ and $X^2$ are hydrogen, bromo, chloro, nitro or cyano,
$X^3$, and $X^4$ are nitro,
$X^8$ is hydrogen,
$Y^1$ and $Y^2$ are $(CH_2)_m$-phenyl,
$Y^3$ is hydrogen or methyl,
$Y^4$ is $(C_1-C_8)$-alkyl, and
n and m is 1 or 2.

18. The dye mixture according to claim 15, wherein independent from each other
$R^1$ is hydrogen,
$R^2$ is methyl or ethyl,
$X^1$ and $X^2$ are hydrogen, bromo, chloro, nitro or cyano,
$X^3$, and $X^4$ are nitro,
$X^8$ is hydrogen,
$Y^1$ and $Y^2$ are $(CH_2)_m$-phenyl,
$Y^3$ is hydrogen,
$Y^4$ is $(C_1-C_4)$-alkyl, and
n and m is 1 or 2.

19. The dye mixture according to claim 15, comprising at least one dye of formula (2).

20. The dye mixture according to claim 15, comprising at least one dye of formula (5a).

21. The dye mixture according to claim 15, comprising at least one dye of formula (5b).

22. An aqueous solution for dying comprising the dye mixture according to claim 1.

23. A process for the production of the dye mixture according to claim 1 comprising
a) mixing dye(s) of formula (1) with the required amount of dye(s) according to formulae (2), (3), (4), (5a) and/or (5b),
b) homogenizing the mixture obtained in step a).

24. A process for dyeing or printing carboxamido- and/or hydroxyl-containing material, comprising contacting the carboxamido- and/or hydroxyl-containing material with the dye mixture according to claim 1.

25. An ink for digital textile printing comprising the dye mixture according to claim 1.

26. Fiber and blends containing such fiber selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers comprising the dye mixture according to claim 1 either in chemically and/or physically bound form.

27. The dye mixture according to claim 1 which comprises
a) at least two different dyes of formula (3),
b) at least one dye of formula (3) and at least one dye of formula (4) or
c) at least two different dyes of formula (3) and at least one dye of formula (4).

28. An aqueous solution for dying comprising the dye mixture according to claim 8.

29. A process for the production of the dye mixture according to claim 8 comprising
a) mixing dye(s) of formula (1) with the required amount of dye(s) according to formulae (2), (3), (4), (5a) and/or (5b),
b) homogenizing the mixture obtained in step a).

30. A process for dyeing or printing carboxamido- and/or hydroxyl-containing material, comprising contacting the carboxamido- and/or hydroxyl-containing material with the dye mixture according to claim 8.

31. An ink for digital textile printing comprising the dye mixture according to claim 8.

32. Fiber and blends containing such fiber selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers comprising the dye mixture according to claim 8 either in chemically and/or physically bound form.

33. An aqueous solution for dying comprising the dye mixture according to claim 15.

34. A process for the production of the dye mixture according to claim 15 comprising a) mixing dye(s) of formula (1) with the required amount of dye(s) according to formulae (2), (3), (4), (5a) and/or (5b), b) homogenizing the mixture obtained in step a).

35. A process for dyeing or printing carboxamido- and/or hydroxyl-containing material, comprising contacting the carboxamido- and/or hydroxyl-containing material with the dye mixture according to claim 15.

36. An ink for digital textile printing comprising the dye mixture according to claim 15.

37. Fiber and blends containing such fiber selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers comprising the dye mixture according to claim 15 either in chemically and/or physically bound form.

* * * * *